(12) United States Patent
Amariei et al.

(10) Patent No.: US 12,044,541 B2
(45) Date of Patent: *Jul. 23, 2024

(54) COMPUTER-IMPLEMENTED METHOD, WEARABLE DEVICE, COMPUTER PROGRAM AND COMPUTER READABLE MEDIUM FOR ASSISTING THE MOVEMENT OF A VISUALLY IMPAIRED USER

(71) Applicant: DOTLUMEN S.R.L., Cluj-Napoca (RO)

(72) Inventors: Cornel-Marian Amariei, Giurgiu (RO); Gabriel Chindris, Cluj (RO); Daniel Cosovanu, Suceava (RO)

(73) Assignee: DOTLUMEN S.R.L., Cluj-Napoca (RO)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,487

(22) Filed: May 26, 2022

(65) Prior Publication Data

US 2022/0282985 A1     Sep. 8, 2022

Related U.S. Application Data

(63) Continuation of application No. 17/574,189, filed on Jan. 12, 2022, now Pat. No. 11,371,859.

(30) Foreign Application Priority Data

Jan. 29, 2021   (EP) ..................................... 21154462

(51) Int. Cl.
   *G01C 21/36*     (2006.01)
   *A61H 3/06*     (2006.01)
   (Continued)

(52) U.S. Cl.
   CPC ......... *G01C 21/3629* (2013.01); *A61H 3/061* (2013.01); *G01C 21/3461* (2013.01);
   (Continued)

(58) Field of Classification Search
   CPC ............ G01C 21/3629; G01C 21/3461; G01C 21/3608; G01C 21/3617; G01C 21/3652;
   (Continued)

(56) References Cited

U.S. PATENT DOCUMENTS

| 3,594,823 A | 7/1971 | Bach-Y-Ritta et al. |
| 5,973,618 A | 10/1999 | Ellis |

(Continued)

OTHER PUBLICATIONS

Zhang et al., "Wearable Indoor Navigation System with Context Based Decision making for Visually Impaired", International Journal of Advanced Robotics and Automation, 2016, 1:1-11.

*Primary Examiner* — Hussein Elchanti
(74) *Attorney, Agent, or Firm* — Fish & Richardson P.C.

(57) ABSTRACT

In a first aspect of the invention, it is claimed a computer-implemented method for assisting the movement of a visually impaired user by means of a wearable device 1, comprising the following steps:
   S1—Acquiring data from the environment of the visually impaired user
   S2—Fusing the acquired data, creating, repeatedly updating of a Live Map
   S3—Determining, repeatedly updating and storing, of at least one navigation path together with associated navigation guiding instructions for the visually impaired user to navigate from the current position of the visually impaired user to a point of interest, repeatedly selecting one preferred navigation path from the at least one navigation path, and repeatedly sending to the
(Continued)

visually impaired user the preferred navigation path, together with associated navigation guiding instructions.

15 Claims, 16 Drawing Sheets

(51) Int. Cl.
G01C 21/34 (2006.01)
G09B 21/00 (2006.01)

(52) U.S. Cl.
CPC ..... *G01C 21/3608* (2013.01); *G01C 21/3617* (2013.01); *G01C 21/3652* (2013.01); *G09B 21/007* (2013.01); *A61H 2003/063* (2013.01); *A61H 2201/1604* (2013.01); *A61H 2201/165* (2013.01); *A61H 2201/5048* (2013.01); *A61H 2201/5064* (2013.01); *A61H 2201/5082* (2013.01); *A61H 2201/5084* (2013.01); *A61H 2201/5092* (2013.01)

(58) Field of Classification Search
CPC .............. A61H 3/061; A61H 2003/063; A61H 2201/165; A61H 2201/5048; A61H 2201/5064; A61H 2201/5082; A61H 2201/5084; A61H 2201/5092; G09B 21/007

See application file for complete search history.

(56) References Cited

U.S. PATENT DOCUMENTS

| | | | |
|---|---|---|---|
| 6,356,210 B1* | 3/2002 | Ellis | A61H 3/061 704/275 |
| 8,271,449 B2* | 9/2012 | Jung | G06F 16/29 707/661 |
| 9,429,446 B1* | 8/2016 | Searle | A61H 3/061 |
| 9,629,774 B2 | 4/2017 | Dayal et al. | |
| 9,770,382 B1* | 9/2017 | Ellis | G01S 13/93 |
| 9,915,545 B2 | 3/2018 | Chen et al. | |
| 11,112,261 B2* | 9/2021 | Kimia | G01C 21/3602 |
| 11,371,859 B1* | 6/2022 | Amariei | G01C 21/20 |
| 2003/0057973 A1* | 3/2003 | Nojima | G09B 23/28 324/754.21 |
| 2004/0083035 A1 | 4/2004 | Ellis | |
| 2007/0005245 A1* | 1/2007 | Ellis | G09B 21/006 701/469 |
| 2008/0040951 A1* | 2/2008 | Kates | H04M 1/05 36/136 |
| 2008/0266106 A1* | 10/2008 | Lim | G01S 13/82 340/572.7 |
| 2009/0005973 A1* | 1/2009 | Salo | G06Q 30/02 701/533 |
| 2009/0032590 A1* | 2/2009 | Hopkins | A61H 3/061 235/385 |
| 2009/0215536 A1* | 8/2009 | Yee | A63F 13/235 463/30 |
| 2010/0004860 A1* | 1/2010 | Chernoguz | G01C 22/006 235/105 |
| 2010/0007474 A1* | 1/2010 | Behm | A61H 3/061 340/407.1 |
| 2010/0176952 A1 | 7/2010 | Bajcsy et al. | |
| 2011/0148652 A1* | 6/2011 | Kim | H04B 13/005 340/691.1 |
| 2011/0172907 A1* | 7/2011 | Rui Da Silva Freitas | G09B 21/006 701/533 |
| 2014/0100771 A1* | 4/2014 | Ekpar | G05D 1/0276 701/400 |
| 2014/0315570 A1* | 10/2014 | Yun | H04W 64/003 455/456.1 |
| 2014/0331131 A1* | 11/2014 | DeSellem | G07F 9/009 715/708 |
| 2016/0021435 A1* | 1/2016 | Topchy | G08C 23/02 340/870.3 |
| 2018/0283891 A1* | 10/2018 | Andrew | G01C 21/3679 |
| 2019/0113774 A1* | 4/2019 | Anderson | G02C 5/143 |
| 2020/0043368 A1* | 2/2020 | Brathwaite | H04W 4/80 |
| 2020/0326199 A1* | 10/2020 | Hendrix | H04S 7/304 |
| 2020/0341563 A1* | 10/2020 | Poore | G06F 3/012 |
| 2022/0026990 A1* | 1/2022 | Mani | G09B 21/007 |

* cited by examiner

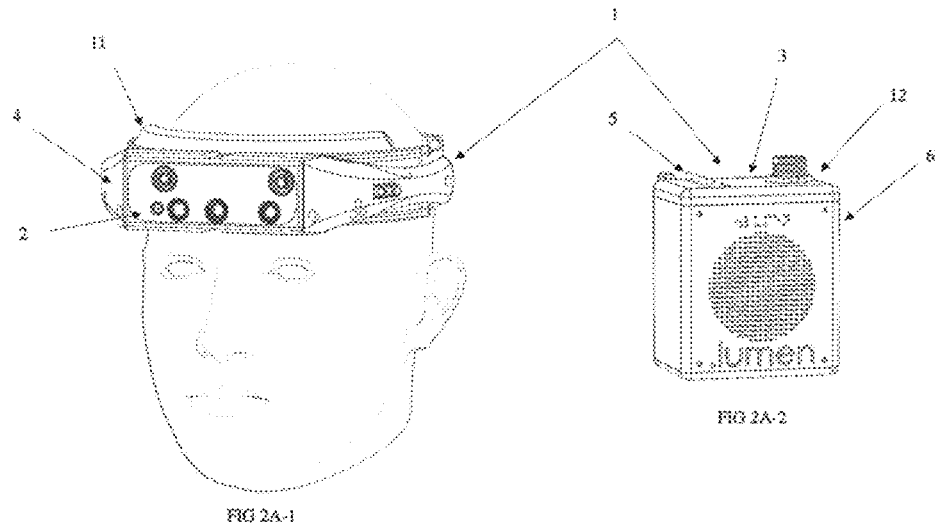
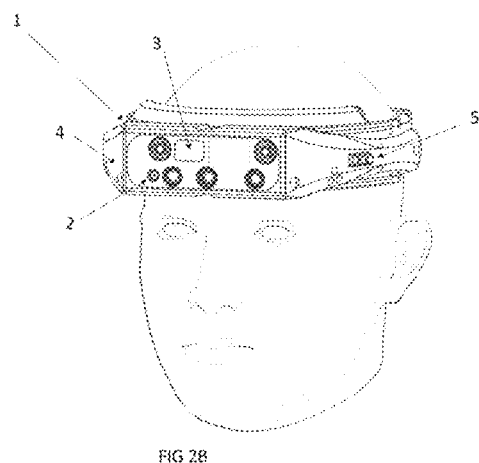
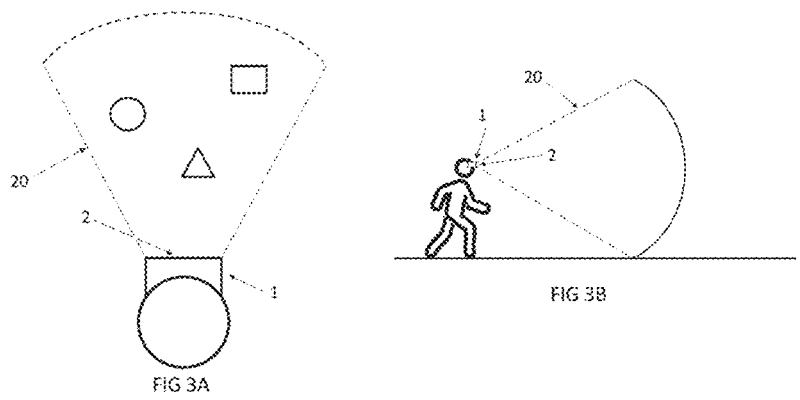

Real window 85   Sound represented window

COMPUTER-IMPLEMENTED METHOD, WEARABLE DEVICE, COMPUTER PROGRAM AND COMPUTER READABLE MEDIUM FOR ASSISTING THE MOVEMENT OF A VISUALLY IMPAIRED USER

CROSS-REFERENCE TO RELATED APPLICATION

This application is a continuation of U.S. application Ser. No. 17/574,189, filed Jan. 12, 2022, which claims prior to European Pat. App. No. 21154462.2, filed Jan. 29, 2021, both of which is incorporated herein by reference.

FIELD

The invention is related to the field of assistance of the movement of visually impaired persons. In particular the invention is related to a method and a wearable device for assisting the movement of a visually impaired person, which throughout the invention shall be called visually impaired user. The term "visually impaired" shall encompass throughout the invention the moderate impairment as well as severe impairment (blindness).

BACKGROUND

Studies have shown that 36 million people were affected by severe impairment in 2015 while 216.6 million had moderate to severe visual impairment. While these numbers are increasing, people become more aware of their needs and solutions targeted at aiding visual disability emerge. For example, cities are becoming more accessible to blind individuals using classic navigation methods such as the walking cane or the guide dog. Technological solutions also emerge and begin being accepted by the blind and visually impaired community. Solutions such as the ones proposed by OrCam Inc. or Microsoft Inc. have seen various levels of adoption. However, despite the advancements in technology, the most used solution for the visually impaired persons is still the walking cane.

Technological solutions for assisting the visually impaired persons are not new. Early efforts can be attributed to Paul Bach-Y-Ritta et al. in U.S. Pat. No. 3,594,823A. There, visual signal has been translated to haptic feedback on the back of blind individuals.

Generally speaking, the technological solutions for assisting the visually impaired persons emerged in one or more of the following categories:

- Sensorial substitution—using an available sense to represent information not normally received through said sense. Several other efforts have been made in the following years to replace visual information using other senses, such as the tactile sense, or sound,
- Ways of generating paths for the visually impaired person and communicating said paths to him/her, by using the sensorial substitution,
- Ways of localizing the position of the visually impaired person in its environment and/or localizing various objects that can be considered obstacles and/or target destinations,
- Ways of communicating the information regarding the environment, paths, obstacles to the visually impaired person and receiving feedback from him/her.

Various solutions address one or more of the above-captioned categories.

U.S. Pat. No. 9,915,545 published 26 Jul. 2015 discloses a method for providing directions to a blind person using a smart device. The method includes detecting, by at least two sensors and in response to a selection of a find mode of the smart device, image data corresponding to a surrounding environment of the smart device and positioning data corresponding to a positioning of the smart device; receiving by an input device the desired object or desired location; determining by a processor the initial location of the smart device based on the image data, the positioning data and map data stored in a memory of the smart device; providing by the output device of directions to the desired object based on the initial location of the smart device and the map data.

U.S. Pat. No. 9,629,774 published 16 Jul. 2015 discloses a smart necklace that includes a body defining at least one cavity and having a neck portion and first and a second side portions. The necklace includes a pair of stereo cameras that is configured to detect image data including depth information corresponding to a surrounding environment of the smart necklace. The necklace further includes a positioning sensor configured to detect positioning data corresponding to a positioning of the smart necklace. The necklace includes a non-transitory memory positioned in the at least one cavity and configured to store map data and object data. The smart necklace also includes a processor positioned in the at least one cavity, coupled to the pair of stereo cameras, the positioning sensor and the non-transitory memory. The processor is configured to determine output data based on the image data, the positioning data, the map data and the object data. In an academic article published 15 Nov. 2016, "Wearable Indoor Navigation System with Context Based Decision Making for Visually Impaired", the authors Xiaochen Zhang et al. present a wearable indoor navigation system for the visually impaired. The system uses Simultaneous Localisation and Mapping SLAM and semantic path planning for the localisation and navigation, integrating m sensors and feedback devices such as an RGB-D camera, an Inertial Measurement Unit IMU and a web camera. The system applies the RGB-D based visual odometry algorithm to estimate the user's location and orientation and the Inertial Measurement Unit IMU to refine the orientation error. Major landmarks such as room numbers and corridor corners are detected by the web camera and the RGB-D camera and matched to the digitalized floor map so as to localize the user. The path and motion guidance are generated to guide the user to a desired destination. The article suggests a way to improve the fitting between the rigid commands and optimal machine decisions for human beings in a context-based decision-making mechanism on path planning to resolve user's confusions caused by incorrect observations.

DISADVANTAGES OF PRIOR ART

In respect to the sensorial substitution, the known solutions generally propose an improper replacement of the bandwidth of eyesight which is known to be far greater than the one embedded in the auditory and/or the haptic senses, providing either too scarce information or too much non-essential information, confusing or annoying the user.

In respect to the ways of generating the map as well as the ways of generating paths for the visually impaired person and communicating said paths to him/her, the Navigation/GPS-based methods of prior art offer a general path but do nothing to avoid obstacles or living beings.

In respect to the ways of localizing the position of the visually impaired person in its environment and/or localizing various objects that can be considered obstacles and/or target destinations, methods such as Microsoft Seeing AI or OrCam recognize only the objects that are present in their limited field of view but do not offer sufficient information about how to reach the target destinations. In general, the known solutions have no or reduced possibility to store the position of the objects detected by the sensors and, consequently no or reduced possibilities to recognize objects detected in the past. The known solutions have no possibilities to provide full information about the objects, information that may be of use for the visually impaired person such as: if a chair is occupied by other person, the sizes and other physical and chemical characteristics of the objects which leads to the need that the visually impaired person touches said objects in order to perceive said physical and chemical characteristics, which is not very hygienic, can be dangerous and may take too much time.

In respect to the ways of communicating the information regarding the environment, paths or obstacles to the visually impaired person and receiving feedback from him/her, most of current solutions communicate the information too slowly to the visually impaired person and/or receive from him/her the feedback too slow, which leads to difficult and delayed modification of the initial path.

For example, in an embodiment of U.S. Pat. No. 9,629,774, although the smart necklace may recognize stairs, exits restrooms or empty seats, said necklace is not configured to provide more in-depth information such as characteristics of the objects: orientation, where is the latch or doorknob or if the empty seat is dirty.

U.S. Pat. No. 9,629,774 teaches a limited number of types of commands that the smart necklace can transmit to the visually impaired user: different degrees of turns, such as 45-degree turn, a 90-degree turn, left turn, right turn. Using this way of communicating the information, U.S. Pat. No. 9,629,774 is rigid when compared with the natural path generation of the non-visually impaired person.

U.S. Pat. No. 9,629,774 teaches about a map that contains only location of various objects without any other characteristics.

U.S. Pat. No. 9,915,545 teaches a method for providing directions to a blind user of an electronic device, the directions being from a current location of the electronic device to a location of a desired object. In this method there is no differentiation between the types of areas on which the paths are generated, there are no relationships built between various objects, some important of the characteristics of the objects and living beings are left out, such as the detection of the emotional status of the living beings or the degree of cleanliness of a surface, and the content of the map is reduced to the information from the field of view of the sensors.

PROBLEM SOLVED BY THE INVENTION

The problem to be solved by the invention is to provide for a method for assisting the movement of the visually impaired user that allows the user to navigate indoor and outdoor in a manner closer to the navigation of a non-visually impaired user. In particular, the problem to be solved by the invention is:
  to provide more accurate and more detailed representation of the environment of the user including providing more accurate and more detailed relationships between the objects and living beings with the objective of a safer navigation of the visually impaired user and a more concrete navigation goal;
  to provide more accurate and more detailed generation of the navigation paths;
  to provide better guidance of the visually impaired user along the navigation paths in terms of accuracy and security;
  to provide better guidance of the visually impaired user along the navigation paths in terms of more comfort and giving the possibility to take decisions similar to those of a non-visually impaired user;

SUMMARY OF THE INVENTION

In order to solve the problem, the inventors conceived in a first aspect of the invention a method for assisting the movement of a visually impaired user by means of a wearable device, comprising the following steps:
S1
Acquiring data from the environment of the visually impaired user by means of a sensory unit 2 of the wearable device 1, sensing from a field of view 20, sending said acquired data to a Sensory Fusion sub-unit 30 of a Processing and control unit 3 of the wearable device 1,
S2
Fusing the acquired data by the Sensory fusion sub-unit 30, sending the fused data to a Live Map sub-unit 31 of the Processing and control unit 3,
Creating, repeatedly updating and storing by the Live Map sub-unit 31 of a Live Map 310, the Live Map 310 comprising the following data:
  1. Live Map determinations based on fused data received from the Sensory Fusion sub-unit 30, including:
    A position and an orientation of the sensory unit 2,
    A plurality of objects On,
    A plurality of living beings (Ln),
  2. Live Map determinations that are generated based on a plurality of relationships Rn between the plurality of objects On and/or the plurality of living beings Ln received from a Relationship Manager sub-unit 32 of the Processing and control unit 3,
  3. Live Map determinations that are generated based on a free area A defined as an ensemble of areas on a ground not occupied by the plurality of objects On and the plurality of living beings Ln, the free area A including:
    A walkable area WA that satisfies a set of permanent predetermined walkable area requirements,
    A conditional walkable area CWA that satisfies said set of permanent predetermined walkable area requirements, and at least one predictable conditional walkable area requirement,
S3
Automatically or in response to a request from the visually impaired user determining, by a Navigation Manager sub-unit 33 of the Processing and control unit 3, repeatedly updating and storing, of at least one navigation path Pn and associated navigation guiding instructions for the visually impaired user to navigate from the current position of the sensory unit 2 to a point of interest PI selected among the plurality of objects (On) and/or the plurality of living beings Ln, Automatically or in response to a request from the visually impaired user repeatedly selecting a preferred navigation path SP from the at least one navigation path Pn, that satisfies at least two navigation path requirements:
  i) Passes through the walkable area WA and/or on the conditional walkable area CWA, and
  ii) Meets a set of safety requirements including a non-collision requirement, and a non-aggressivity requirement.

Wherein any request from the visually impaired user is made by using haptic means 51 or audio means 52 of a User commands interface 5, said requests being received by the Navigation Manager sub-unit 33 via a User commands interface Manager sub-unit 34 of the Processing and control unit 3, and transmitting by the Navigation Manager sub-unit (33) to a Feedback Manager sub-unit 35 of the Processing and control unit (3)
i) of the preferred navigation path SP and
ii) of the associated navigation guiding instructions,
wherein, when the preferred navigation path SP passes through the conditional walkable area CWA, the Navigation Manager sub-unit) sends to the Feedback Manager sub-unit the associated navigation guiding instruction corresponding to said at least one predictable conditional walkable area requirement
S4

Providing, by the Feedback Manager sub-unit 35 guidance to the visually impaired user, along the preferred navigation path SP, by using guiding modes for transmitting each associated navigation guiding instruction, each navigation instruction comprising haptic and/or auditory cues sent by the Feedback Manager sub-unit 35 to a Feedback unit 4 of the Processing and control unit (3), said Feedback unit 4 comprising:
haptic feedback actuators 41 configured for placement on the head of the visually impaired user, and/or
auditory feedback actuators 42 configured for placement to one or both to the ears of the visually impaired user,
wherein the guiding modes for each associated navigation guiding instruction are selected by the visually impaired user by the User commands interface 5 and through user commands that are received by the Feedback Manager sub-unit 35 via the User commands interface Manager sub-unit 34.

In a second aspect of the invention, it is provided a wearable device 1 for assisting the movement of a visually impaired user, comprising:
a Sensory unit 2 configured to be placed on the head of the visually impaired user, comprising basic sensors:
a Camera 21,
a Depth sensor 22,
an Inertial Measurement unit 23
a Sound localisation sensor 24
a Processing and control unit 3 comprising:
a Sensory fusion sub-unit 30 comprising:
a Localisation module 301,
a Walkable Area Detection module 302,
an Orientation Computation module 303,
a Sound Direction Localisation module 304,
a Sound Classification module 305,
an Object 2D Characteristics Extraction module 306,
an Object 3D Characteristics Fusion module 307,
an Object Sound Characteristics Fusion module 308,
a Live Map sub-unit 31,
a Relationship Manager sub-unit 32,
a Navigation Manager sub-unit 33,
a User commands interface Manager sub-unit 34,
a Feedback Manager sub-unit 35,
a Sound representation sub-unit 36,
a Feedback unit 4 configured to be placed on the head of the visually impaired user, comprising:
a plurality of haptic feedback actuators 41 comprising:
left haptic feedback actuators 411,
right haptic feedback actuators 412,
centre haptic feedback actuators 413,
a plurality of auditory feedback actuators 42 comprising:
left auditory feedback actuators 421,
right auditory feedback actuators 422,
a User commands interface 5 configured to be placed on the head of the visually impaired user comprising:
a plurality of user commands haptic means 52,
a plurality of user commands audio means 52,
a Power storage unit 6,
a memory M, and
electronic communications means between the Sensory unit 2, the Processing and control unit 3, the Feedback unit 4, the User commands interface 5 , the Power storage unit 6 and the memory M, by communication protocols,
wherein the wearable device is configured to apply the steps of the method according to any embodiment of the invention.

In a third aspect of the invention, it is provided a computer program comprising instructions which, when the program is executed by the wearable device causes the wearable device 1 to carry out the steps of the computer-implemented method for assisting the movement of a visually impaired user, in ny of the preferred embodiments, including combinations thereof. In a fourth aspect of the invention, it is provided a computer readable medium having stored thereon instructions which, when executed by the wearable device 1, causes the wearable device 1 to carry out the steps of the computer-implemented method, in any of the preferred embodiments, including combinations thereof.

In a fifth aspect of the invention, it is provided a non-transitory computer-readable storage device storing software comprising instructions executable by one or more computers which, upon such execution, cause the one or more computers to perform operations of the computer-implemented method, in any of the preferred embodiments, including combinations thereof. In a sixth aspect of the invention, it is provided a system comprising one or more computers and one or more storage devices storing instructions that are operable, when executed by the one or more computers, to cause the one or more computers to perform operations of the computer-implemented method, in any of the preferred embodiments, including combinations thereof. According to one example implementation, a computer-implemented method comprising includes acquiring data from an environment of a visually impaired user, comprising a sensory unit of a wearable device sensing from a field of view, sending the acquired data to a sensory fusion sub-unit of a processing and control unit of the wearable device, fusing the acquired data by the sensory fusion sub-unit, sending the fused data to a live map sub-unit of the processing and control unit, and creating, repeatedly updating, and storing, by the live map sub-unit, a live map. The live map includes one or more live map determinations that are generated based on the fused data received at the processing and control unit from the sensory fusion sub-unit, including a position and an orientation of the sensory unit, a plurality of objects, and a plurality of living beings, one or more live map determinations that are generated based on a plurality of relationships between the plurality of objects or the plurality of living beings or between the plurality of objects and the plurality of living beings that are received from a relationship manager sub-unit of the processing and control unit, one or more live map determinations that are generated based on a free area that is defined as an ensemble of areas on a ground not occupied by the plurality of objects and the plurality of living beings, the free area including a walkable area that satisfies a set of permanent predetermined walkable area requirements, and a conditional walkable area that satisfies the set of permanent predetermined walkable area requirements, and at least one predictable conditional walkable area requirement. The method includes automatically or in response to a first request from the visually impaired user, determining, by a navigation manager sub-unit of the processing and control unit, repeatedly updating and storing, at least one navigation path and associated navigation guiding instructions for the visually impaired user to navigate from a current position of the sensory unit to a point of interest selected among the plurality of objects or the plurality of living beings or the plurality of objects and the plurality of living beings, automatically or in response to a second request from the visually impaired user, repeatedly selecting a preferred navigation path from the at least one navigation path that (i) passes through the walkable area or on the conditional walkable area or on the walkable area and on the conditional walkable area, and (ii) meets a set of safety requirements including a non-collision requirement, and a non-aggressivity requirement, where any request from the visually impaired user is made by using haptic means or audio means of a user commands interface the requests being received by the navigation manager sub-unit via a user commands interface manager sub-unit of the processing and control unit, transmitting, by the navigation manager sub-unit to a feedback manager sub-unit of the processing and control unit, the preferred navigation path and the associated navigation guiding instructions, where, when the preferred navigation path passes through the conditional walkable area, the navigation manager sub-unit sends to the feedback manager sub-unit the associated navigation guiding instruction corresponding to the at least one predictable conditional walkable area requirement, providing, by the feedback manager sub-unit, guidance to the visually impaired user, along the preferred navigation path, using guiding modes for transmitting each associated navigation guiding instruction, each navigation instruction comprising haptic or auditory cues sent by the feedback manager sub-unit to a feedback unit of the processing and control unit, the feedback unit including haptic feedback actuators configured for placement on the head of the visually impaired user, or auditory feedback actuators configured for placement to one or both ears of the visually impaired user, or haptic feedback actuators configured for placement on the head of the visually impaired user and auditory feedback actuators configured for placement to one or both ears of the visually impaired user, where the guiding modes for each associated navigation guiding instruction are selected by the visually impaired user by the user commands interface and through user commands that are received by the feedback manager sub-unit via the user commands interface manager sub-unit.

Some implementations may include one or more of the following features. For example, the method may include creating and updating the live map, including repeatedly determining the position and orientation of the sensory unit, a position, orientation and characteristics of the plurality of objects and of the plurality of living beings, based on the fused data received from the sensory fusion sub-unit, and repeatedly sending the created and updated live map to a localization module of the sensory fusion sub-unit, repeatedly generating and updating, by the relationship manager sub-unit, the plurality of relationships between the plurality of objects or the plurality of living beings or the plurality of objects and the plurality of living beings based on the data acquired from the live map including applying a set of the predetermined relations requirements, and repeatedly sending the updated plurality of relationships to the live map, repeatedly localizing, by a localization module the position and orientation of the sensory unit with respect to the plurality of the objects, and, to the plurality of living beings of the live map using localization algorithms applied to the data received from the sensory unit and data from the of the live map and repeatedly sending the localization data of the position and orientation of the sensory unit to a walkable area detection module of the sensory fusion sub-unit, repeatedly determining, by the walkable area detection module, the free area based on the data received from the sensory unit, the data received from the localization module, the set of permanent predetermined walkable area requirements, and the at least one predictable conditional walkable area requirement calculated and stored in the memory, and repeatedly sending the updated free area to the live map, and repeatedly storing the updated live map in the memory. The live map may be updated by the sensory fusion sub-unit using simultaneous localization and mapping (SLAM) algorithms. The method may include sending an information request by the visually impaired user to a sound representation sub-unit of the processing and control unit regarding at least one object selected from the plurality of objects or at least one living being selected from the plurality of living beings, extracting by a sound representation sub-unit of the processing and control unit from the live map the information regarding the selected at least one particular object or at least one particular living being; representing the extracted information as corresponding spatialized sounds, transmitting the spatialized sounds to the visually impaired user by the feedback unit, selecting, by the visually impaired user of the point of interest from the plurality of objects or from the plurality of living beings, and transmitting the corresponding selection request to the navigation manager sub-unit. The method may include determining by the navigation manager wandering path together with the associated navigation guiding instructions for the visually impaired user, and sending the wandering path and the associated navigation guiding instructions to the feedback manager sub-unit. The haptic cues may vary in duration, periodicity, intensity or frequency of the vibration according to predetermined preferred navigation path complexity criteria, and the audio cues may vary in frequencies, duration, repetition intensity, or 3d spatial virtualization according to the predetermined preferred navigation path complexity criteria. A three-dimensional walkable tunnel may be defined as a virtual tunnel of predetermined cross-section, having as horizontal longitudinal axis the preferred navigation path, and wherein the guiding mode further comprises specific haptic cues sent to the visually impaired user when the visually impaired user is approaching the virtual walls of the walkable tunnel. The preferred navigation path may be divided into predetermined segments delimited by a plurality of milestones, and the guiding mode may include haptic cues or auditory cues signaling the position of a next at least one milestone providing associated navigation guiding instructions to the visually impaired user from a current milestone to a subsequent milestone, and the length of the predetermined segments may vary depending on the complexity and length of the preferred navigation path. The guiding mode may include haptic cues or auditory cues or haptic and auditory cues signaling a direction on the preferred navigation path. The direction on the preferred navigation path may be determined by the line defined by an origin of the sensory unit and an intersection of the preferred navigation path with a circle having an origin at the position of the sensory unit and a radius with a predetermined length, and the auditory cues signaling the direction on the preferred navigation path may originate from a spatialized sound source placed at a predetermined first distance of the spatialized sound source s with respect to the sensory unit. The auditory cues may be spatialized sounds originating from a spatialized sound source that virtually travels along a predetermined second distance on the preferred navigation path from the position of the sensory unit until the spatialized sound source reaches the end of the predetermined second distance and back to the position of the sensory unit.

In another general implementation, a wearable device for assisting the movement of a visually impaired user includes a sensory unit configured to be placed on the head of the visually impaired user, including a camera, a depth sensor, an inertial measurement unit, and a sound localization sensor. The device includes a processing and control unit including a sensory fusion sub-unit including a localization module, a walkable area detection module, an orientation computation module, a sound direction localization module, a sound classification module, an object 2d characteristics extraction module, an object 3d characteristics fusion module, and an object sound characteristics fusion module. The device includes a live map sub-unit, a relationship manager sub-unit, a navigation manager sub-unit, a user commands interface manager sub-unit, a feedback manager sub-unit, and a sound representation sub-unit. The device includes a feedback unit configured to be placed on the head of the visually impaired user, including a plurality of haptic feedback actuators including left haptic feedback actuators, right haptic feedback actuators, center haptic feedback actuators, a plurality of auditory feedback actuators including left auditory feedback actuators, and right auditory feedback actuators The device includes a user commands interface configured to be placed on the head of the visually impaired user including a plurality of user commands haptic means, and a plurality of user commands audio means. The device includes a power storage unit, a memory, and electronic communications component between the sensory unit, the processing and control unit, the feedback unit, the user commands interface, the power storage unit and the memory. Example implementations may include one or more of the following features. The sensory unit may include at least one additional sensor, from among a global positioning sensor configured to determine the absolute position of the sensory unit, or a temperature sensor configured to determine the temperature of the objects and of the living beings. The sensory fusion sub-unit may include a relative-to-absolute conversion module that is configured to fuse the data from the object sound characteristics fusion module with the data regarding the absolute position of the sensory unit, and an object temperature characteristics fusion module that is configured to fuse the data from the object sound characteristics fusion module with the data regarding the temperature of the objects and of the living beings, and to send the fused data to the live map sub-unit.

Other example implementations may include a system including one or more processors; and one or more non-transitory machine-readable storage devices storing instructions that are executable by the one or more processors to perform operations corresponding to the disclosed methods, or a non-transitory computer storage medium encoded with a computer program, the computer program comprising instructions that when executed by one or more processors cause the one or more processors to perform operations corresponding to the disclosed methods. Any feature in one aspect of the invention may be applied to other aspects of the invention, in any appropriate combination. In particular, method features may be applied to device features, and vice versa.

Wherever applicable, means—plus—function features may be expressed alternatively in terms of their corresponding structure, such as a suitably programmed processor and associated memory.

Particular combinations of the various features of the invention can be implemented and/or supplied and/or used independently.

ADVANTAGES OF THE INVENTION

The main advantages of this invention are the following:
It provides a safer navigation of the visually impaired user and a more accurate access to the objects and living beings of everyday life due to:
a more accurate and more detailed representation of the environment of the user;
a more accurate and more detailed generation of the navigation paths;
a more accurate and a safer guidance of the user along the navigation paths;
It provides a navigation experience closer to the experience of non-visually impaired user in terms of comfort and possibility to make decisions.

BRIEF DESCRIPTION OF THE DRAWINGS

FIG. 2A 1 and FIG. 2A 2 are representations of two component wearable device FIG. 2B Single component wearable device FIG. 3A and FIG. 3B Schematic representation of the field of view of basic sensors 20

FIG. 14 Top view of the real-life scenario scene

FIG. 15. Trimetric view of the real-life scenario scene

FIG. 16. Detail from the secondary path 912

FIG. 17. Detail—the doorbell 841 replaces the door 84 as point of interest PI FIGS. 18 to 28 Exemplification of the method—Example No. 2. The window 85 is represented symbolically FIG. 18 Example No. 2-1—schematic representation of the step S.3-0.2 of the method wherein the spatialized sound S86 is perceived in the same location of the window 85

FIG. 25 Example No. 2-9—schematic representation of the step S.3-0.2 of the method wherein the shape of the window 25 is represented by the single spatialized sound source S86 that virtually travels from the starting point starting point to on the contour of the window 85 until it reaches back the starting point starting point to.

LIST OF REFERENCES

Figure 1:
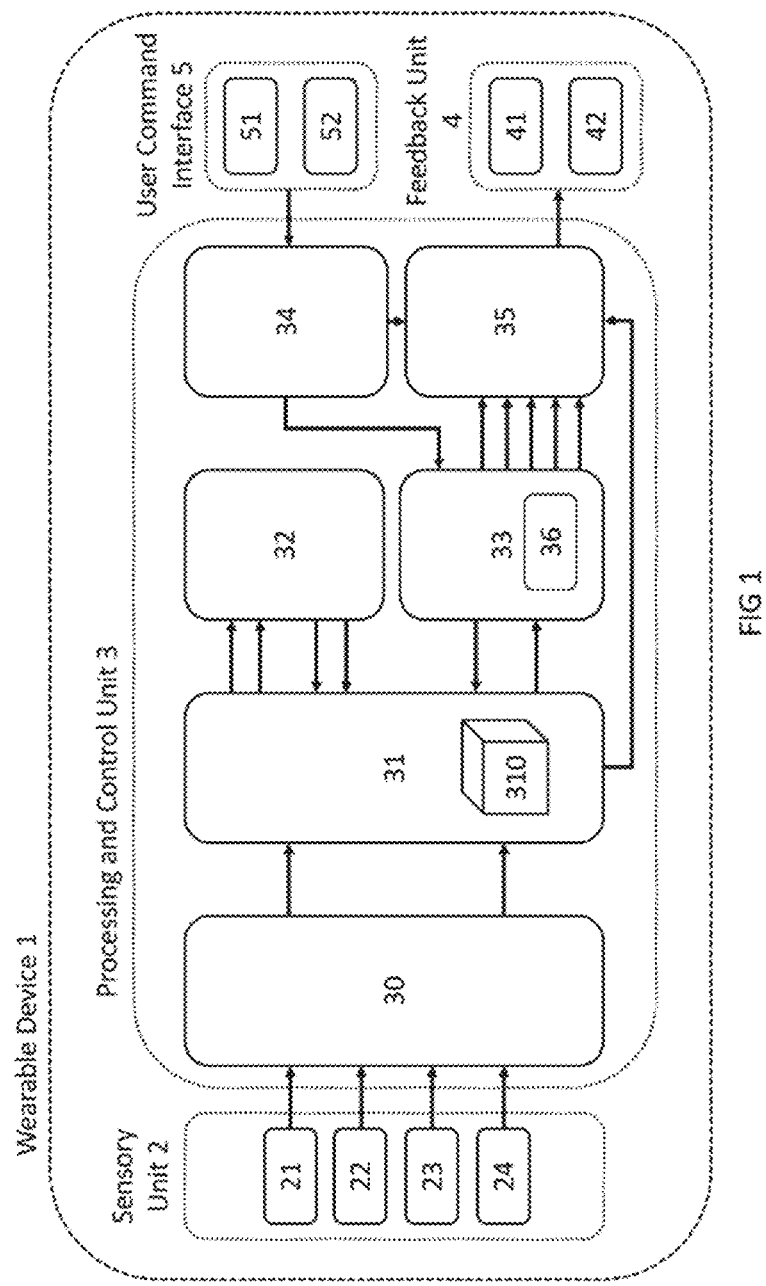
FIG. 1 Schematic representation of the method and of the wearable device 1 according to the invention

This list includes references to components, parameters or criteria presents in the description and/or drawings. It is created to ease the reading of the invention.

1 Wearable device
11 Headset component
12 Belt-worn component
12 Wrist component—not represented graphically
13 Hand-held component—not represented graphically
2 Sensory unit
Basic sensors: 21, 22, 23,24
20 field of view of the basic sensors
21 Camera
22 Depth sensor
21-22 Camera and Depth Sensor—not represent graphically
23 Inertial Measurement unit
24 Sound localisation sensor
21-22 Camera and Depth Sensor—not represent graphically
Additional sensors 25,26
25 Global positioning sensor
26 Temperature sensor
3 Processing and control unit
30 Sensory Fusion sub-unit
301 Localisation module
302 Walkable Area Detection module
303 Orientation Computation module
304 Sound Direction Localisation module
305 Sound Classification module
306 Object 2D Characteristics Extraction module
307 Object 3D Characteristics Fusion module
308 Object Sound Characteristics Fusion module
309-1 Relative to Absolute Conversion module
309-2 Object Temperature Characteristics fusion module
31 Live Map sub-unit
310 Live Map
32 Relationship Manager sub-unit
33 Navigation Manager sub-unit
34 User commands interface Manager sub-unit
35 Feedback Manager sub-unit
36 Sound representation sub-unit
4 Feedback unit
41 Haptic feedback actuators
411 Left feedback actuators
412 Right feedback actuators
413 Centre feedback actuators
42 Auditory feedback actuators
421 left auditory feedback actuators
422 right auditory feedback actuators
5 User commands interface
51 User commands haptic means
52 User commands audio means
6 Power storage unit—not represented graphically
M Memory—not represented graphically
7 Communication unit—not represented graphically
Content of the Live Map 310
 Live Map determinations based on the fused data received from the Sensory Fusion sub-unit 30
  position and orientation of the sensory unit 2
  On a plurality of objects
  Ln a plurality of living beings—not represent graphically
 Live Map determinations based on the data received from the Relationship Manager sub-unit 32:

a plurality of relationships Rn between the plurality of objects On and/or the plurality of living beings Ln=relations—not represent graphically A Free Area A:
  WA walkable area
  CWA conditional walkable area
  NA non-walkable area Minimum Requirements
  For the areas:
  a set of permanent predetermined walkable area requirements
  at least one predictable conditional walkable area requirement
  For the relations:
  categories of predetermined relations requirements including:
  predetermined parent-child relations and
  predetermined conditional relations
  For the navigation paths Pn:
  two navigation path requirements
  safety requirements
  a non-collision requirement
  a non-aggressivity requirement
  be on the WA or on the CWA Criteria for Selection
  a set of path selection criteria
  cost criteria
  cost-time to destination criteria
  comfort criteria
  predetermined preferred navigation path complexity criteria Criteria for the Spatialized Sounds
  predetermined spatialized sounds criteria Requests and Selections by the Visually Impaired User
  an initiation request
  a selection request
  an information request Paths Determined by the Navigation Manager Sub-unit 33
  Pn at least one navigation path—not represent graphically
  SP preferred navigation path
  WP wandering path—not represented graphically
  PI point of interest
  PI-OLD old point of interest
  PPI potential point of interest—not represented graphically Guiding modes for transmitting the corresponding navigation guiding instructions
  T walkable tunnel
  93 milestones 93
  r radius with a predetermined length of the circle having the origin the position of the Sensory unit 2
  94 intersection of the circle having the radius d1 with the preferred navigation path SP
  S spatialized sound source
  d1 predetermined first distance of the spatialized sound source S in respect to the Sensory unit 2
  d2 predetermined second distance Example No. 1

FIGS. 14 to 17

84 initial point of interest=entrance door, as a particular example of objects On from the plurality of objects On selected as point of interest PI two entrance doors 84-01 and respectively 84-02, not represented graphically as examples of objects On from the plurality of objects On out of which it is selected the point of interest 84

841 further point of interest=doorbell 841, as another particular example of the point of interest PI

83 dog, as a particular example of living being Ln from the plurality of living beings Ln

831 traffic lights

832 pedestrian crossing

942 walkable area, as a particular example of the walkable area WA

941 non-walkable area, as a particular example of the non-walkable area NA

943 conditional walkable area, as a particular example of the conditional walkable area CWA

911 initial navigation path, as a particular example of the preferred navigation path SP

912 secondary navigation path, as another particular example of the preferred navigation path SP

922 walkable tunnel, as a particular example of the walkable tunnel T

Group of Examples No. 2—FIGS. 18 to 28

85—windows, as particular examples of objects On from the plurality of objects On that are potential points of interest PPI and as example of category of objects On

85-1 first window

85-2 second window

85-3 third window—not represented graphically

85-4 fourth window—not represented graphically

Chosen extremities of the any of the windows 85: 85-E1 and 85-E2.

S86 corresponding spatialized sounds of windows

S86-1 corresponding to the first window 85-1—not represented graphically

S86-2 corresponding to the second window 85-2—not represented graphically

S86-3 corresponding to the third window 85-3—not represented graphically

S86-4 corresponding to the fourth window 85-4—not represented graphically

Particular Examples of Spatialized Sounds

S86$f$ spatialized sound having a particular frequency—not represented graphically S86$f$-1 spatialized sound having a particular frequency corresponding to the window 85-1

S86$f$-2 spatialized sound having a particular frequency corresponding to the window 85-2

S86$f$1, and S86$f$2 spatialized sound sources being encoded with different frequency that virtually moves on the contour of the window 85

S86$p$ spatialized sound having a particular pulse—not represented graphically

S86$t$ spatialized sound having a particular time characteristic—not represented graphically S86$t$-1, and S86$t$-2 spatialized sound having different time characteristics for representing the shape of the frames of the two windows 85-1 and 85-2.

S86$t$11-1, S86$t$12-1, spatialized sounds having different time characteristics virtually moving on the contour of the window 85-1 for representing the shape of the exterior frame of the window 85-1

S86t21-1, S86t22-1, spatialized sounds having different time characteristics virtually moving on the contour of the window 85-1 for representing the shape of the interior frame of the window 85-1

S86P punctiform sound,

S86P1, and S86P2 spatialized punctiform sounds virtually moving on the contour of the window 85

S86P-E1, and S86P-E2 two spatialized punctiform sounds corresponding to the extremities of the window 85-E1 and 85-E2.

S86L linear sound

S86l1, and S86l2 spatialized sounds virtually moving in an angled pattern within the space between the contour of the interior frame, and the exterior contour of the window 85.

$t_0$ starting point, and $t_{final}$ end point in time of spatialized sound sources virtually moving on the contour of the window 85 detailed description and examples of realization With reference to FIG. 1, the wearable device 1 comprises the following: a Sensory unit 2, a Processing and control unit 3, a Feedback unit 4, a User commands interface 5.

The wearable device 1 comprises two hardware units not represented graphically: a Power storage unit 6, and a memory M.

Throughout the invention, it shall be understood that the visually impaired person is wearing the wearable device 1 and that the wearable device 1 is switched on. Therefore, any reference in the description, claims and drawings to the wearable device 1 or to the Sensory unit 2 shall be understood as including a reference to the position of the visually impaired person. For simplicity, throughout the invention, the visually impaired user shall be referred to as "he", encompassing all gender situations.

Details about the configuration and location of the hardware units will be given in the section of the description that relates to the configurations of the wearable device 1.

For a better understanding of the method, the basic components of the hardware units are briefly described keeping the pace together with the disclosure of the method.

The Sensory unit 2 is placed on the head of the visually impaired user and comprises basic sensors:
a Camera 21,
a Depth sensor 22,
an Inertial Measurement unit 23
a Sound localisation sensor 24

The Processing and control unit 3 comprises:
a Sensory fusion sub-unit 30,
a Live Map sub-unit 31,
a Relationship Manager sub-unit 32,
a Navigation Manager sub-unit 33,
User commands interface Manager sub-unit 34,
a Feedback Manager sub-unit 35,
a Sound representation sub-unit 36, The Sensory fusion sub-unit 30 comprises:
a Localisation module 301,
a Walkable Area Detection module 302,
an Orientation Computation module 303,
a Sound Direction Localisation module 304,
a Sound Classification module 305,
an Object 2D Characteristics Extraction module 306,
an Object 3D Characteristics Fusion module 307,
an Object Sound Characteristics Fusion module 308, FIG. 2 illustrates a preferred location of the Sensory unit 2 on the forehead of the visually impaired user. Throughout the detailed description and the figures, it is exemplified the preferred location on the forehead of the user. The person skilled in the art shall understand that the invention is not limited to placing the Sensory unit 2 on the forehead.

The method according to the invention includes 4 steps. The four steps will be firstly described briefly in their succession. Then, steps 2, 3 and 4 will be detailed.

S1 The sensory unit 2 of the wearable device 1, placed on the head of visually impaired user, acquires data from the environment of the visually impaired user.

For this purpose, the sensory unit 2 senses from a field of view 20 having as origin the position of the sensory unit 2.

S2 The data sensed by the sensory unit 2 is sent to the Sensory fusion sub-unit 30.

The Sensory fusion sub-unit 30 fuses the data acquired from the sensory unit 2 by data processing algorithms that include filtering, smoothing, and artificial intelligence-based algorithms, and then sends the fused data to the Live map sub-unit 31 of the Processing and control unit 3.

Further on, the Live Map sub-unit 31 creates, repeatedly updates and stores a Live Map 310. The Live Map 310 comprises three categories of data:

1. Live Map determinations that are generated based on fused data received from the Sensory Fusion sub-unit 30, 2. Live Map determinations that are generated based on a plurality of relationships Rn between the plurality of objects On and/or the plurality of living beings Ln, 3. Live Map determinations based on a free area A.

Figure 4:
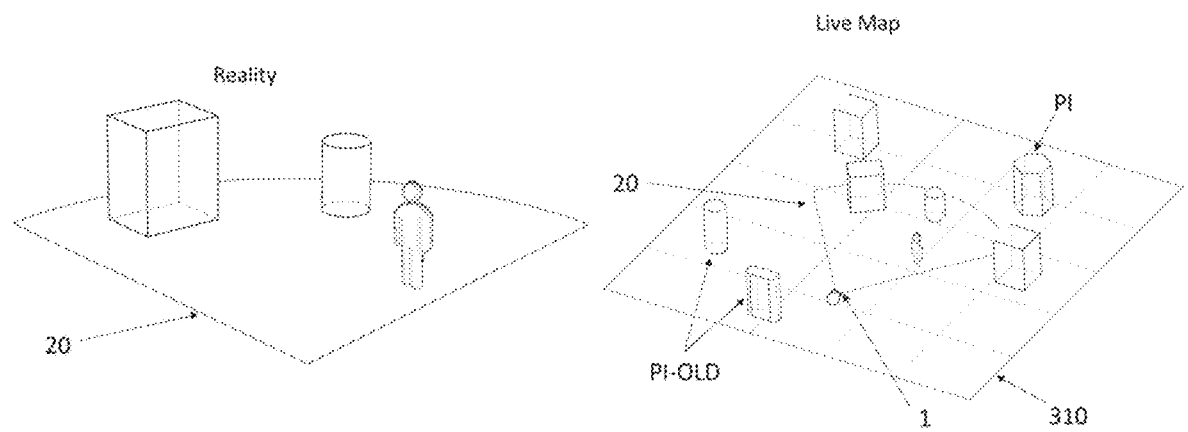
FIG. 4 Schematic representation of the content of the reality and of the Live Map 310

The Live Map 310 is a database stored in the memory M. Throughout the invention, the update and store of the data in the Live Map 310 shall include the update and store of the Live Map 310 in the memory M. The way the Live Map 310 is stored is outside the scope of the invention. FIG. 3A and FIG. 3B schematically shows the field of view 20 having as origin the position of the sensory unit 2, while FIG. 4 schematically shows the content of the field of view 20 and of the Live Map 310 as compared with the real environment.

In an embodiment of the present invention, the Live map 310 already exists in the memory M. In this case, the territorial range of the Live Map 310 is determined by the content stored in the past in the Live Map 310. As it can be seen from FIG. 4, the Live Map 310 includes objects that are no longer in the field of view 20, but they were in the field of view 20 in the past. The Live Map 310 of FIG. 4 includes an old point of interest PI-OLD, that is a point of interest in the past.

1. The Live Map determinations based on the fused data received from the Sensory Fusion sub-unit 30 include the following determinations:

A position and an orientation of the sensory unit 2,
A plurality of objects On. For each object On the determinations refer to:
  its position,
  its physical, acoustical, and chemical characteristics,
  its orientation,
  the prediction of its future position in a predetermined unit of time,
A plurality of living beings Ln. For each living being Ln the determinations refer to
  its position,
  its biological and acoustical characteristics,
  its orientation, current activity and mood status,
  the prediction of its future position in the predetermined unit of time.

2. The Live Map determinations based on the plurality of relationships Rn between the plurality of objects On and/or the plurality of living beings Ln are received from a Relationship Manager sub-unit 32 of the Processing and control unit 3.

The Relationship Manager sub-unit 32 imports the most recent updates from the Live Map 310 by querying the Live Map sub-unit 31 for updates in the Live Map 310.

Computations are based on predetermined relations requirements, comprising at least:
predetermined parent-child relations, and
predetermined conditional relations.

For simplicity, throughout the invention:
the term "relations" is used as equivalent wording for the plurality of relationships Rn, and
the plurality of relationships Rn, alternatively called relations, refer to both static and dynamical relationships.

After carrying out the computations, the Relationship Manager sub-unit 32 sends the updated relations as result of the computations to the Live map sub-unit 31 to store same in the Live Map 310.

Details regarding the generation of the plurality of relationships Rn are given in the section related to S.2.2 below.

3. The Live Map determinations based on the free area A

The free area A is defined as an ensemble of areas on a ground not occupied by the plurality of objects On and the plurality of living beings Ln.

Said free area A is divided into three categories:
A walkable area WA that satisfies a set of permanent predetermined walkable area requirements, defining the walkable area WA as an area on which the visually impaired user can walk on without being injured,
A conditional walkable area CWA that satisfies said set of permanent predetermined walkable area requirements, and satisfies at least one predictable conditional walkable area requirement, and
A non-walkable area NA that does not satisfy neither the set of permanent predetermined walkable area requirements, nor the at least one additional predictable conditional walkable area requirement.

In S3, automatically or in response to a request from the visually impaired user, a Navigation Manager sub-unit 33 of the Processing and control unit 3 determines, repeatedly updates and stores in the memory M, one or more navigation paths Pn for the visually impaired user to navigate from the current position of the sensory unit 2 to a point of interest PI selected among the plurality of objects On and/or the plurality of living beings Ln.

The term "navigation" shall be understood in this invention as encompassing:
the walking of the visually impaired user towards an object On or a living being Ln,
the everyday gestures and actions made with one or both hands or limbs of the visually impaired user for finding and reaching various objects such as the toothbrush, the doorknob, etc.

Non-limiting examples of navigation paths Pn include:
Navigation paths Pn for walking outdoors,
Navigation paths Pn for walking indoors,
Navigation paths Pn for reaching a large variety of objects for a variety of purposes: from small objects such as a comb to large objects such a plane.

The Navigation Manager sub-unit 33 repeatedly selects, automatically or in response to the request from the visually impaired user, one preferred navigation path SP. If only one navigation path Pn was determined, then the preferred navigation path SP is the navigation path Pn. If two or more navigation paths Pn were determined, the Navigation Manager sub-unit 33 repeatedly selects one of them as the preferred navigation path SP.

The preferred navigation path SP is repeatedly sent by the Navigation Manager sub-unit 33 together with associated navigation guiding instructions, to a Feedback Manager sub-unit 35 of the Processing and control unit 3.

In order to determine one or more navigation paths Pn, the Navigation Manager sub-unit 33 queries the Live Map 310 in order to check if at least two navigation path requirements are met. The first navigation path requirement is that all navigation paths Pn—thus including the preferred navigation path SP, must pass through the walkable area WA and/or on the conditional walkable area CWA.

The second navigation path requirement is to meet a set of safety requirements in respect to the plurality of objects On and/or the plurality of living beings Ln positioned or predicted to be positioned in the proximity of the at least one navigation path Pn in the predetermined unit of time. The proximity is predetermined, for example at 0.3 m from the position of the wearable device 1.

The set of safety requirements includes at least one non-collision requirement and at least one non-aggressivity requirement. Other safety requirements may be defined for various specific needs arising either from the needs of the visually impaired person e.g., elderly person, or from the characteristics of the environment where the visually impaired person usually lives, e.g., a densely populated urban area or from both.

The non-collision requirement means that the individual paths of plurality of objects On and/or the plurality of living beings Ln must not collide with the at least one navigation path Pn.

The non-aggressivity requirement means that the mood of the plurality of living beings Ln must not anticipate an aggressive action directed against the visually impaired user.

Other navigation path requirements may be defined by the user such as but not limited to the requirement to avoid crowded areas or to avoid passing through zones with slopes higher than a predetermined value.

The navigation path requirements are predetermined and stored in the memory M. They are applied by the Navigation Manager sub-unit 33. The visually impaired user can set other predetermined navigation path requirements by means of the User commands interface Manager sub-unit 34.

When the selected navigation path SP passes through the conditional walkable area CWA, the Navigation Manager sub-unit 33 sends to the Feedback Manager sub-unit 35 an associated navigation guiding instruction associated to said at least one predictable conditional walkable area requirement.

The determination of the at least one navigation path Pn is initiated either automatically by the Navigation Manager sub-unit 33 or by receiving from the visually impaired user of an initiation request, In case the Navigation Manager sub-unit 33 determines two or more navigation paths Pn, the selection of the preferred navigation path SP is carried out either automatically by the Navigation Manager sub-unit 33 or by receiving by said Navigation Manager sub-unit 33 of a selection request from the visually impaired user.

The Navigation Manager sub-unit 33 can be configured such that, by default, the selection of the preferred navigation path SP be carried out either automatically by the Navigation Manager sub-unit 33, or according to the selection request from the visually impaired user.

When carried out automatically by the Navigation Manager sub-unit 33, the selection of the preferred navigation path SP is based on applying a set of pre-determined path selection criteria including cost criteria, cost-time to destination criteria, comfort criteria. The application of the path selection criteria is carried out according to prior art.

The requests made by the visually impaired user are made by using haptic means 51 or audio means 52 of a User commands interface 5. These requests are received by the Navigation Manager sub-unit 33 via a User commands interface Manager sub-unit 34 of the Processing and control unit 3.

In S4 the Feedback Manager sub-unit 35 guides the visually impaired user along the preferred navigation path SP, by using guiding modes for transmitting each associated navigation guiding instruction as received from the Navigation Manager sub-unit 33.

The guiding modes are sent by the Feedback Manager sub-unit 35 to a Feedback unit 4 of the Processing and control unit 3. Each navigation guiding instruction comprises haptic and/or auditory cues.

The guiding modes are:
either by haptic cues by using haptic feedback actuators 41 of the Feedback unit 4, configured for placement on the forehead of the visually impaired user, or
by auditory cues by using auditory actuators 42 of the Feedback unit 4, configured for placement adjacent to one or both ears of the visually impaired user, or
by combining the haptic cues with the auditory cues.

The selection of the guiding modes for each associated navigation guiding instruction is carried out by the visually impaired user by the User commands interface 5 and through user commands that are received by the Feedback Manager sub-unit 35 via the User commands interface Manager sub-unit 34.

Figure 5:
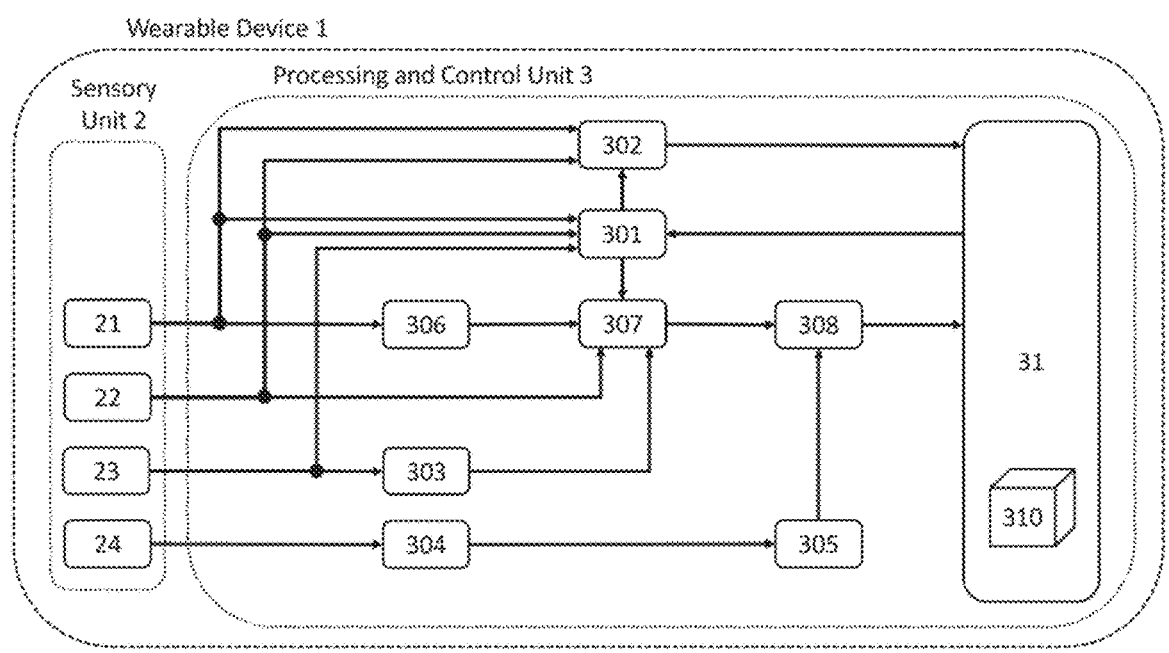
FIG. 5 Schematic representation of the creation of the Live Map 310 when the wearable device 1 uses only the basic sensors FIG. 6 Trimetric view of one of the preferred embodiments, showcasing the headset component 11 as viewed from the back of the head of the visually impaired user and detailing the positioning of the components of the Feedback unit 4 and of the components of the User commands interface 5

Details Regarding S2—With Reference to FIG. 5

The Live Map 310 can be compared with a multi-layer cake, as several layers of information are added from the first sub-step until the last sub-step as described below. With each layer, the Live Map 310 acquires a higher level of detail and accuracy. The creation is continuous, having as result the continuous update and continuous storage of the Live Map 310.

The advantage of creating multiple information layers in the Live Map 310 is related to the ease of use of understanding and accessing the data. As each individual layer contains specific information which is relevant to certain other components of the system, this facilitates faster access to the information.

S 2.1. The Live Map sub-unit 31 creates and updates the Live Map 310 by repeatedly determining the position and orientation of the sensory unit 2, the position and orientation, and characteristics of the plurality of objects On, of the plurality of living beings Ln, based on the fused data received from the Sensory Fusion sub-unit 30, and repeatedly sends the created and updated Live Map 310 to a Localisation module 301 of the Sensory Fusion sub-unit 30, S 2.2. The Relationship Manager sub-unit 32 repeatedly generates and updates a plurality of relationships Rn between the plurality of objects On and/or the plurality of living beings Ln based on the data acquired from the Live Map 310 comprising applying a set of the predetermined relations requirements. The plurality of relationships Rn, repeatedly updated, are repeatedly sent to the Live Map 310, thus updating the Live Map 310 content as outputted from S 2.1. with the layer referring to the content of the plurality of relationships Rn, S 2.3. The Localisation module 301 repeatedly localizes the position and orientation of the sensory unit 2 with respect to the plurality of the objects On, and, respectively to the plurality of living beings Ln of the Live Map 310 using localisation algorithms applied to the data received from the sensory unit 2 and data from the of the Live Map 310. The localisation of the position and orientation of the sensory unit 2 is repeatedly sent to a Walkable Area Detection module 302 of the Sensory fusion sub-unit 30, thus updating the Live Map 310 content as outputted from S 2.2 with the layer referring to the localisation data of the position and orientation of the sensory unit 2 in respect to the plurality of the objects On, and, respectively to the plurality of living beings Ln.

S 2.4. The Walkable Area Detection module 302 repeatedly determines the free area A, based on:
i) the data received from the sensory unit 2,
ii) the data received from the Localisation module 301,
iii) the set of permanent predetermined walkable area requirements, and
iv) the at least one predictable conditional walkable area requirements calculated and stored in the memory M of the Walkable Area Detection module 302.

The components of the free area A repeatedly updated, are repeatedly sent to the Live Map 310, thus updating the Live Map 310 content as outputted from S 2.3 with the layer referring to the components of the free area A.

S.2.5. The updated Live Map 310 is repeatedly stored in the memory M.

S.2.1. Details regarding the Live map determinations based on fused data

The Orientation Computation module 303 determines the current position and orientation of the Sensory unit 2 of the wearable device 1, of the plurality of the objects On and the plurality of living beings Ln in respect to the sensory unit 2 based on the inertial movement data provided by the Inertial Measurement unit 23. For this purpose, the Orientation Computation module 303 applies an orientation computation algorithm that calculates the orientation of the system on the 3 axes (pitch, roll, yaw) and for the 3D positioning of objects since the Camera 21 and Depth sensor 22 reveal where are the detected objects On in respect to the Camera 21, but not how they are oriented in respect to the ground.

The Object 2D Characteristics Extraction module 306 provides the pixel-wise segmentation of the 2D images acquired from the Camera 21, and detects in the pixel-wise segmented 2D images each object On of the plurality of the objects On, and each living being Ln of the plurality of living beings Ln placed in the field of view 20, and determines their respective position in 2D coordinates, and their respective physical characteristics.

The Object 2D Characteristics Extraction module 306 uses an Object 2D Characteristics Extraction Algorithm that combines several actions:

Object Detection to determine the type of objects On or living beings Ln, their 2D position and their relative 2D size and their 2D centre, their 2D motion vector in respect to the Camera 21 by comparing the data between several subsequent images;

Object Pose Detection to determine the orientation of the object in 2D coordinates, Skeleton Pose detection to determine the posture of living beings Ln by skeleton orientation, which is used to understand activities of living beings Ln, such as run, sit, cough, etc. and status, for example sleeps, is awake, etc.

Face feature detection to determine empathic status, such as smiles, laughs, cries, etc., and also activity status: sleeping, awake, tired, etc.

Object Characteristics Determination which comprises algorithms for various aspects, such as:

the degree of occupancy of a chair, a handlebar, a fridge or a room—for example by comparing how much of it is visible versus how it should be according to a customary image;

the degree of 2D filling of a container for example in the case of transparent containers;

the degree of dirtiness of a product for example by comparing of the objects On captured by the Camera 21 with a known images of clean similar objects On, and computing differences. Further on, the Object 3D Characteristics Fusion module 307 receives data from the Object 2D Characteristics Extraction module 306, from the Orientation Computation module 303, and from the Depth sensor 22, and determines further detailed information about 2D information received from the Object 2D Characteristics Extraction module 306 regarding the plurality of the objects On, and plurality of the living beings Ln.

Thus, the Object 3D Characteristics Fusion module 307 determines the position each of the objects On in respect to the Sensory unit 2 in 3D coordinates, their physical characteristics, such as dimensions, composition, structure, colour, shape, humidity, temperature, degree of occupancy, degree of cleanliness, degree of usage, degree of wear, degree of stability, degree of fullness, degree of danger, and their orientation in respect to the Sensory unit 2, and the future position at predetermined moments in time in 3D coordinates based on the vector of movements, respectively.

The Object 3D Characteristics Fusion module 307 also determines data regarding position of each of the living beings Ln in 3D coordinates, their physical characteristics, like height, their skeleton pose orientation, and the prediction of its future position in the predetermined unit of time, respectively. Based on skeleton pose orientation, facial expression and their physical characteristics the Object 3D Characteristics Fusion module 307 determines the current activity and mood status of each of the living beings Ln.

The Sound Direction Localisation module 304 determines the direction of the plurality of sound streams expressed in 3D coordinates emitted respectively by each of the plurality of the objects On and the plurality of living beings Ln based on the data received from the Sound localisation sensor 24.

In one embodiment of the method, the direction of the plurality of sound streams is determined by comparing the differences of a sound stream between microphones of the Sound localisation sensor 24 while knowing the position of the microphones. The Sound Direction Localisation module 304 triangulates the source of the sound stream coming, detecting the direction from which the sound stream comes.

Each of the plurality of sound streams whose direction has been determined by the Sound Direction Localisation module 304 is classified into sound types by means of the Sound Classification module 305.

The Object Sound Characteristics Fusion module 308 adds acoustical characteristics to each of the plurality of the objects On and the living beings Ln for which the 3D coordinates have been determined based on the classified sound types determined by the Sound Classification module 305.

Then, the Object Sound Characteristics Fusion module 308 sends all fused data to the Live Map sub-unit 31 in order to be stored in the Live Map 310.

S.2.2. Details regarding the generation of the plurality of relationships Rn

The Live Map determinations based on the data received from the Relationship Manager sub-unit 32 provide further detailed information defining the environment of the visually impaired user. In this way the Relationship Manager sub-unit 32 of provides more accurate and detailed information about the objects On and the living beings Ln fulfilling the invention's objective of a safer navigation of the visually impaired user and a more concrete navigation goal, the latter being defined in the invention as the point of interest PI.

The algorithms used by the Processing and control unit 3 include but are not limited to: Object Detection, Object Pose Detection, Object Characteristics Determination. The algorithms used by the processing and control unit 3 define as item:

each object On from the plurality of objects On,
each living being Ln from the plurality of living beings Ln,
each component part of each object On, for example: the leg of the chair,
each part of each living being Ln.

For example, in case of the object On is a four-leg chair, the chair is defined as a separate item from each one of its four legs.

The degree of itemization is predetermined being outside the scope of the invention.

The processing and control unit 3 creates clusters of objects based on their physical relationships.

Thus, predetermined parent-child relations connect the separate items so that they can form objects On, living beings Ln or ensembles between more than two objects On, more than two living beings Ln or objects On and living beings Ln. For example: the door handle belongs to the door. Both the door handle and the door are items. The main difference between the items on one hand, and the objects On and living beings Ln on the other hand is that the objects On and living beings Ln correspond to the usual expectation of the people about what an object and a living is, whereas for the algorithms all the objects On and the living beings Ln as well as their components are treated as items.

The predetermined conditional relations refer to connecting the separate items only if a condition is satisfied, for example the pedestrian crossing is a conditional walkable area, conditioned on the colour of the traffic light.

The Relationship Manager sub-unit 32 uses the data from the Live Map 310 to compute possible relations using specific algorithms.

For parent-child relations, non-limiting examples of algorithms are as follows:

Physical proximity: If the items corresponding to the objects On or to the living beings Ln are in physical proximity, they form a parent-child relation:

If a cap and an open water bottle are close by, the water bottle becomes the parent of the cap which is the child, If a keyboard or mouse is close by to a computer, they become the child towards the computer which becomes the parent, If a living being pet such as a dog or cat is detected in close proximity to a living being human, the pet becomes the child of the human which becomes the parent, If a door handle is close to a door, it becomes the child of the door. Likewise, the doors of the vehicles are children for the vehicle.

Physical proximity with containment: If the items corresponding to the objects On or to the living beings Ln are in physical proximity, and one object or living being is contained in the other object they form another parent-child relation:
  If fish are detected in close proximity and contained in a fish tank, the fish become the children of the fish tank which becomes the parent,
  If liquid is detected in a transparent container, the container becomes the parent and the liquid the child,
  If seats are detected in the proximity of a bus and the seats are contained inside the bus, the seats become the children of the bus,
Physical proximity with intersection: If objects On are in physical proximity and one or multiple of their planes are intersecting, they form another parent-child relation:
  If doors and walls are detected in close proximity and their planes are matching, the door becomes a child to the wall,
Creation of new items based on detected relations:
Physical proximity with intersection: if items corresponding to objects On are in close proximity, they intersect, they create a new item type and be allocated as the child of that item:
  If a floor, a roof and multiple walls are detected in proximity and intersecting—all being items, they form a room, which is another item, and become children to the room,
  If multiple rooms are generated, in proximity and intersecting they create a floor, and become children to the floor,
  If one or multiple floors are generated, they create a building and become children to the building.
For conditional relationships non-limiting examples of algorithms are as follows:
  Physical proximity: if items corresponding to objects On are in close proximity they form a conditional relationship:
    If the doorbell is detected in proximity of the door, they form a conditional relationship: one must ring the doorbell before entering the door,
    If a keyhole is detected in proximity of the door handle, they form a conditional relationship: one must unlock the door before operating the door handle,
  Physical proximity with orientation: if items corresponding to objects On are in close proximity, they are oriented in a certain way, they form another conditional relationship:
    If a conditional walkable area CA such as a pedestrian crossing is detected, and a pedestrian traffic light oriented towards the pedestrian crossing is detected, the conditional walkable area CA is conditioned by the colour of the detected traffic light.
Depending on the type of object On or living being Ln, certain properties are transmissible from a parent to a child, for example:
  If the door handles are the children of doors which are the children of a car, when the car moves, even if the door handles or doors are no longer in the field of view 20 of the wearable device 1, their position will be updated, even if the car position has changed meanwhile.
All parameters used in the algorithms for establishing the plurality of relationships Rn are pre-determined: for example, for determining physical proximity predetermined ranges of distances are used.

S.2.3. Details regarding the localisation of the position and orientation of the sensory unit 2

The Localisation module 301 repeatedly determines current position and orientation of the sensory unit 2 of the wearable device 1 and of the plurality of the objects On and living beings Ln in respect to the sensory unit 2, in the 3D coordinates, on the current Live Map 310 by means of localisation algorithms applied to the data acquired from a Camera 21, the Depth sensor 22, an Inertial Measurement unit 23 of the Sensory unit 2.

The results of the localisation are sent to the Walkable Area Detection module 302 which determines the components of free area A.

S.2.4. Details regarding the determination of the components of the free area A.

The set of permanent predetermined walkable area requirements comprises categories that are predetermined for each visually impaired user, taking into consideration various general safety and comfort requirements.

The set comprises at least the following two categories:
  geometric predetermined walkable area requirements refer to the geometry of the space virtually occupied by the visually impaired user. Thus, a virtual cuboid is imagined having its three dimensions adjusted to the dimensions of the visually impaired user. The virtual cuboid ensures protection of the visually impaired user against injury when said visually impaired user is standing still or is moving. Non-limiting examples of requirements from this category are as follows: the oscillations of the level of the ground must not exceed a predetermined height, a beam placed at a certain distance from the ground is considered dangerous if the distance is under a predetermined threshold, etc.
  surface predetermined walkable area requirements: certain ground surface types are excluded such as but not limited to: water film that exceeds a predetermined width, such as 5 cm; ice; mud; streets and roads.

The conditional walkable area CWA does satisfy the set of permanent predetermined walkable area requirements and must satisfy in addition the at least one predictable conditional walkable area requirement.

The set of permanent walkable area requirements as well as the at least one predictable conditional walkable area requirement are predetermined for each visually impaired user and stored in the memory M. The Walkable Area Determination module 302 applies said requirements to the data it receives from the Camera 21 and Depth sensor 22 on one hand and from the Localisation module 301 on the other hand, said data received from the Localisation module 301 including the updates of the relations as received from the Relationship Manager sub-unit 32 and stored in the Live Map 310.

In another preferred embodiment, parts of the Live Map 310 are downloadable form the internet from any geographical maps site, said parts referring to the layers described in S 2.1 to S.2.4 and taking into account that, depending on the geographical maps site from where map is downloaded, the information of each layer can be partial or complete. The download from the internet is carried out using a Communication unit 7, not represented graphically, connected to the internet. In this case, the Localisation module 301 localizes the position and orientation of the sensory unit 2 on the downloaded Live map 310.

In case there is a previously stored Live Map 310 in the memory of the Live map sub-unit 31, the Live Map 310 is created based on the Live Map determinations of the previously stored Live Map 310.

In case a previously stored Live Map 310 exists in the memory M of the wearable device 1, either because it was determined by the Live Map sub-unit 31 previously or because it was downloaded from the internet or both of them, the determinations based on the data received from the sensory unit 2 start with step 2.3 by the identification within previously stored Live Map 310 of the current position and orientation of the sensory unit 2 by means of localisation module 301, and identification of the free area A, including the walkable area WA and the conditional walkable area CWA by the Walkable Area Detection module 302 by means of localisation algorithms applied to the data received form the sensory unit 2.

Further on, the Live map 310 is repeatedly updated with additional information described in S 2.1 to S.2.2 and the remainder of step 2.3 and steps 2.4 and steps 2.5. are carried out as described above.

In a preferred embodiment, the Live Map (310) is updated by the Sensory fusion sub-unit (30) using Simultaneous Localisation and Mapping SLAM algorithms.

The SLAM algorithms are in particular advantageous since they use an iterative process to improve the estimated position with the new positional information. The higher the iteration process, the higher the positional accuracy. This cost more time for computation and high-configuration hardware with parallel processing capabilities of the processing units.

In another preferred embodiment the SLAM algorithms used are visual SLAM algorithms which have the benefits of providing vast information, being cheap and easy to implement since may be used passive sensors and components having extremely low size, weight, and power SWaP footprint.

The invention, as disclosed so far, refers to the cases where the point of interest PI is known to the visually impaired user before sending the initiation request.

In other cases, the visually impaired user has not sufficient information about the point of interest PI before sending the initiation request. Typical examples are when he arrives in a new environment, or when something has changed in the known environment, such as the usual places of the seats.

One example is when the visually impaired user enters a new room that has four windows. He wants to open a window. But which one of the four windows to select as point of interest PI? Or the visually impaired user enters a conference room where there are, say 30 occupied seats and 10 free seats. Which of the 10 free seats to choose as point of interest PI?

To encompass these cases where the visually impaired user needs additional information from his environment in order to select the point of interest PI before sending the initiation request, in another preferred embodiment, when the point of interest PI is not known by the visually impaired user, a sub-step 3-0 is carried out before all the other sub-steps of step 3:

In S.3-0.1. the visually impaired user sends an information request to a Sound representation sub-unit 36 of the Processing and control unit 3 regarding at least one object On selected from the plurality of objects On or at least one living being Ln selected from the plurality of living beings Ln, said at least one object On or at least one living being Ln as a potential point of interest PPI for the visually impaired user. An example of at least one object On selected from the plurality of objects On is a group of windows from a selected room, which may be named "window".

The term "potential" means that any of the objects On from the group of objects On may be selected as initial point of interest PI.

The Sound representation sub-unit 36 is:
either a self-contained sub-unit connected to Live Map sub-unit 31, to the Feedback Manager sub-unit 35, and to the User commands interface sub-unit 34, or
a sub-unit of the Navigation Manager sub-unit 33, as it is represented for simplicity in FIG. 1, or
a module of the Feedback Manager sub-unit 35.

Taking the example of the room with four windows, the visually impaired user sends an information request named "window" through the User commands interface 5 to the Sound representation sub-unit 36 that he is interested to learn how many windows are in the room, their position in the room, the size or the shape of the windows, the position of their handles. The window is in this example the potential point of interest PPI. The information request refers to a predetermined area of interest which is in the proximity of the place where the visually impaired user stands at the moment when he sends the information request, which in this case is the room.

The information request is transmitted by the User commands interface 5 to the Sound representation sub-unit 36 via the User commands interface Manager sub-unit 34, just like the initiation request and the selection request.

In S.3-0.2. the Sound representation sub-unit 36 extracts from the Live Map 310 the information regarding the selected at least one particular object On or at least one particular living being Ln and represents said at least one particular object On or at least one particular living being Ln, respectively, as corresponding spatialized sounds and transmits same to the Feedback Unit 4, via the Feedback Manager sub-unit 35, when the Sound representation sub-unit 36 is not part of said Feedback Manager sub-unit 35.

The representation in spatialized sounds is generated by means of the Sound representation sub-unit 36 by encoding the classified sound types of the selected objects On or, respectively, selected living beings Ln based on predetermined spatialized sounds criteria.

The non-limiting and non-exhaustive examples of the predetermined spatialized sounds criteria are:
binaural virtualization of the sounds depending on specific features of the objects On from said specific category of objects On or specific of living beings Ln from said specific category of living beings Ln,
variation of the frequency, amplitude, period, frequency components, fill factor of the spatialized sounds or duration, and repetition spatialized sounds depending on the distance relative to the visually impaired user of said objects On living beings Ln.

The type of encodings of the classified sound types of the selected objects On or, respectively, the selected living beings Ln based on predetermined spatialized sounds criteria is chosen based on testing procedures determining the ability of the user to distinguish various technical features of the sounds.

The visually impaired user is able to localize each spatialized sound using natural capabilities of the human beings to process sounds emanating from sound sources and following adequate training with the wearable device 1.

The localization of the spatialized sounds is carried out in three spatial dimensions:
horizontal: the azimuth of the wearable device 1 essentially corresponding to the azimuth of the forehead of the visually impaired user, vertical: the elevation, measured from the ground until the wearable device 1 essentially corresponding to the elevation of the forehead of the visually impaired user, the distance range or the near-far dimension, measured from the standing point of the sensory unit 2.

In S. 3-0.3, the visually impaired user selects the point of interest PI from said specific plurality of objects On or, respectively, from said plurality of living beings Ln and transmits the corresponding selection to the Navigation Manager sub-unit 33.

The group of examples No. 2 details the matter of the sound representation.

In some situations, the point of interest PI is not in the Live Map 310, for example, when the visually impaired person arrives to a new destination.

In this case, the Live Map unit 31 sends to the Navigation Manager sub-unit 33 and to the User commands interface Manager sub-unit 34 the confirmation that the point of interest PI is not in the Live Map 310. The method has an additional sub-step in S3 before determining, repeatedly updating and storing the at least one navigation path (Pn):

S 3-1 The Navigation Manager sub-unit 33 determines a wandering path WP -not represented graphically, while S1 and S2 of the method are repeated until the point of interest PI is found and stored in the Live Map 310, said wandering path WP satisfying the at least two navigation path requirements.

It is possible to determine the wandering path WP while the Navigation Manager sub-unit 33 represents as corresponding spatialized sounds specific category of objects On or said specific category of living beings Ln. Once the decision as to the selection of the point of interest PI is taken, the remainder of step 3 and the step 4 of the method are carried out as disclosed.

Details regarding S4

All the guiding modes have the purpose to keep the visually impaired user, when navigating, on the preferred navigation path SP. Each preferred navigation path SP has its own degree of complexity that corresponds to the variety of navigating situations arising from real life. The inventors thought to quantify the degree of complexity of the preferred navigation paths SP by using scores corresponding to predetermined preferred navigation path SP complexity criteria, which include both objective criteria and subjective criteria, the latter being the own interpretation of the visual impaired user of the objective criteria: e.g. what is perceived as a long distance for a specific visually impaired user is not perceived as long for other visually impaired user, the same with noise or temperature of the immediate environment.

Below are presented some non-limiting and non-exhaustive examples of the predetermined preferred navigation path complexity criteria:

Width of the walkable area WA and of the conditional walkable area CWA: it is different to navigate if only 10 cm width walkable area WA than on a 3 m width walkable area WA, Distance left until the point of interest PI, The number of turns and the degree of each turn e.g. 30°, 75°, The slope and/or the number of stairs, Noise of the environment, because it may limit the use of audio cues.

The haptic cues vary in duration, periodicity, intensity or frequency of the vibration according to predetermined preferred navigation path complexity criteria.

The audio cues vary in frequencies, duration, repetition, intensity, or 3D spatial virtualization according to the predetermined preferred navigation path complexity criteria.

The variation of the haptic cues and, respectively audio cues, has the advantage of adapting the guidance of the visually impaired user to the degree of complexity of each preferred navigation path as quantified by the predetermined preferred navigation path SP complexity criteria.

The advantages of the variation of the characteristics of the haptic cues and of the auditory cues as well as the possibility to combine haptic and auditory cues are as follows:

Provides a better guidance of the visually impaired user along the navigation paths in terms of accuracy and security, Provides the possibility to customize the guidance depending on the predetermined preferred navigation path complexity criteria;

Provides a more comfortable navigation offering the visually impaired user the possibility to take more decisions constantly adjusting the cues to his needs.

Haptic Cues

The haptic cues are received through the haptic feedback actuators 41. The visually impaired user receives training before use of the wearable device 1 in order to associate each type of haptic cue with the specific guiding instruction.

Figure 6:
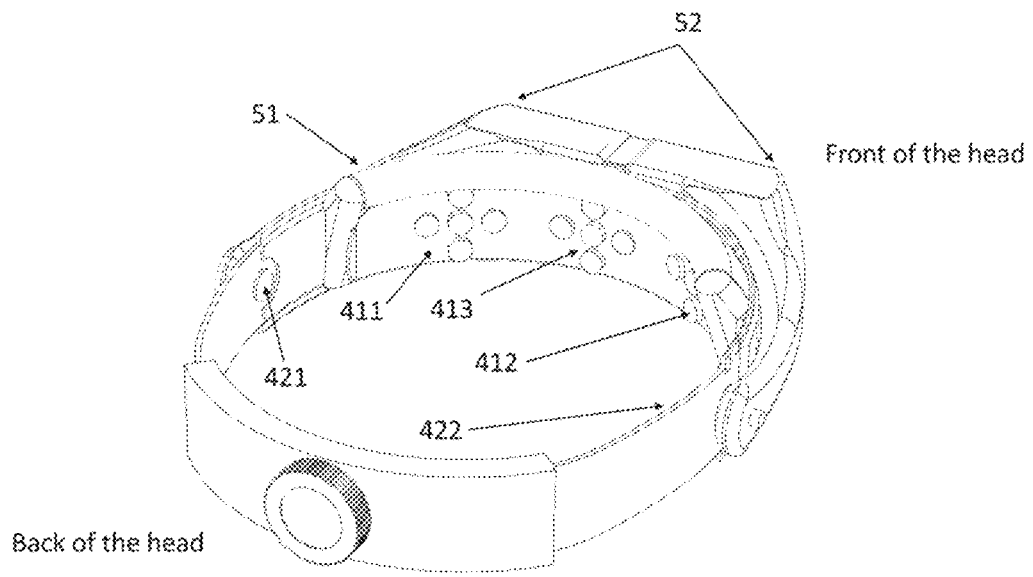
Figure 7:
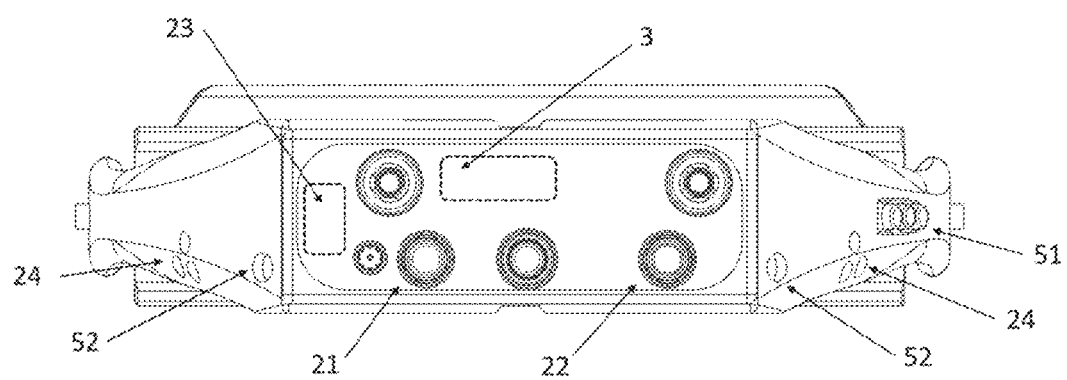
FIG. 7 Frontal view of a detail of the preferred embodiment of FIG. 6, showcasing the headset component 11 as viewed from the forehead of the visually impaired user and detailing the positioning of the four basic sensors and detailing the positioning of the components of the User commands interface 5

With reference to FIG. 6, a minimum number of three haptic feedback actuators 41 is needed, all placed on the azimuth of the forehead—that is on the same horizontal, in order to ensure the minimum three directions of guiding: forward, turn left, turn right.

Left haptic feedback actuators 411 mounted on the left part of the forehead, Right haptic feedback actuators 412 mounted on the right part of the forehead, Centre haptic feedback actuators 413 mounted on the centre of the forehead.

Said haptic feedback actuators 41 include vibrating actuators and close-range remote haptics such as ultrasonic haptic feedback actuators.

Vibrating actuators comprise a plurality of resonant actuators converting the electric signals received from the Feedback Manager 35 into forced vibrations felt on the forehead of the visually impaired user, said vibrations associated with a specific guiding instruction.

A non-limiting example of vibrating actuator used in the invention is a linear resonant actuator. Each of the left haptic feedback actuators 411, right haptic feedback actuators 412 centre haptic feedback actuators 413 can comprise one or more linear resonant actuators.

Using the linear resonant actuators is advantageous for the invention because of their known good haptic performance, their improved efficiency at resonance compared with other vibrating actuators, their capacity of optimizing power consumption and their small size which allows configuring them for example in the form of a matrix, if more than three directions of guiding are envisaged.

There are two types of haptic cues:

Temporal haptic cues are the cues received at equal or unequal intervals of time, by using any haptic feedback actuators 41, Spatiotemporal haptic cues, alternatively called haptic pattern cues, have a temporal component combined with a spatial component, namely a pattern that represents the direction in which the visually impaired user must reorient, e.g. from the bottom to the top or from the top to the bottom, or to the right or to the left and so on. The tactile sensation of direction is obtained, for example, by using the linear resonant actuators because their improved efficiency at resonance enhances the variation of the duration, periodicity, intensity or frequency of the vibration of the haptic cues. The plurality of linear resonant actuators outputs vibrations in a predetermined rapid succession, one linear resonant actuator vibrating after another in the direction in which the visually impaired user must reorient, so that to give the visually impaired user the tactile sensation of having the forehead dragged by someone in the direction in which he must reorient.

Non-limiting examples of applying predetermined preferred navigation path complexity criteria are given below:

The haptic cues are more intense and/or more frequent and/or have higher frequency of vibration directly proportional with:
- the degree of the deviation from the preferred navigation path SP,
- the amount of movement required for the visually impaired user to take, to differentiate a turn of 90° from a turn of only 30°, or climbing 10 stairs from climbing only 2 stairs.

The haptic cues have smaller duration and/or less intensity and/or less speed of the vibration if the estimated time of navigation to the point of interest PI is above a predetermined time threshold in order to avoid fatigue of the visually impaired user from receiving so many haptic cues.

The types of haptic cues are predetermined for each case depending on the needs of the visually impaired user. An example of predetermination of haptic cues is presented below for a better understanding of the teaching of the invention, and not for limiting same:

A first haptic cue for starting the navigation from the current position of the sensory unit 2, A second haptic cue for signalling that the visually impaired user has deviated to the left from the preferred navigation path SP, A third haptic cue for signalling that the visually impaired user has deviated to the right from the preferred navigation path SP, A fourth haptic cue for going forward, A fifth haptic cue for turning left or right, A sixth haptic cue for going up or down, A seventh haptic cue for temporary stop when the navigation has not ended, if the Navigation Manager sub-unit 33 detects that at least one navigation path requirements is not met or if it detects a conditional walkable area CA which requires sending a navigation instruction to stop until the at least one predictable conditional walkable area requirement is met.

An eighth haptic cue for signalling the end of the navigation as the point of interest PI is reached.

Further haptic cues can be defined to accommodate other navigation situations or requirements of the visually impaired user.

To ensure a more accurate guidance and to avoid at the same time unnecessary overloading of the visually impaired user with haptic cues, it is possible to combine the types of haptic cues.

E.g.:
for simple navigation instructions such as start/stop—the first, the seventh, the eighth cue from the example above only temporal cues can be used, whereas
for the complex navigation instructions, the spatiotemporal cues can be used, because the guidance to turn left/right or to go up/down is more accurate when applying the vibration criteria to the haptic pattern cues than when using only temporal haptic cues.

The assignment of each type of haptic cue to one or more from the feedback actuators 41 used is predetermined.

Auditory Cues

Auditory cues are sounds perceptible by humans received through the auditory feedback actuators 42 in the ears of the visually impaired user.

The auditory feedback actuators 42 are speakers, headphones or bone-conduction speakers converting the electric signals received from the Feedback Manager sub-unit 35 into sounds. The associated navigation guiding instructions received through the auditory feedback actuators 42 are based on the principle of assigning a specific sound to each associated navigation guiding instruction.

With reference to FIG. 6, a minimum number of two auditory feedback actuators 42 are used:

Left auditory feedback actuators 421, mounted in or around the left ear,

Right auditory feedback actuators 422 mounted in or around the right ear.

Each of the left auditory feedback actuators 421 and right auditory feedback actuators 422 can comprise a plurality of speakers, headphones or bone-conduction speakers placed on the same azimuth.

The types of auditory cues are predetermined for each case depending on the needs of the visually impaired user. An example of predetermination of auditory cues is presented below for a better understanding of the teaching of the invention, and not for limiting same:

A first auditory cue for starting the navigation from the current position of the Sensory unit 2, A second auditory cue for signalling that the visually impaired user has deviated to the left from the preferred navigation path SP, A third auditory cue for signalling that the visually impaired user has deviated to the right from the preferred navigation path SP, A fourth auditory cue for going forward, A fifth auditory cue for turning left or right, A sixth auditory cue for going up or down, A seventh auditory cue for temporary stop when the navigation has not ended, An eighth auditory cue for signalling the end of the navigation as the point of interest PI is reached, Further types of auditory cues can be defined to accommodate navigation situations or requirements of the visually impaired user.

The assignment of each type of auditory cue to one or more from the auditory feedback actuators 42 is predetermined.

Considering the origin of the sounds, there are two types of sounds:

Simple sounds originating in the auditory feedback actuators 42, used for simple associated navigation guiding instructions such as start and stop, Spatialized sounds originating from one or more spatialized sound sources S, used for all the associated navigation guiding instructions except for start and stop.

Figure 8A:
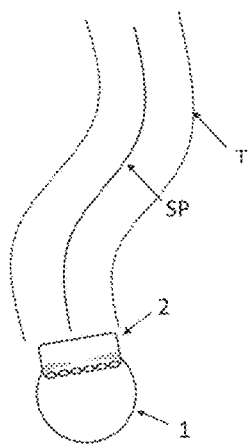
FIG. 8A Schematic representation of the guiding modes using the walkable tunnel T FIG. 8 B Trimetric view of the embodiment showing guiding mode by using the walkable tunnel T FIG. 9 Trimetric view of the embodiment showing guiding mode by using milestones 93
Figure 8B:
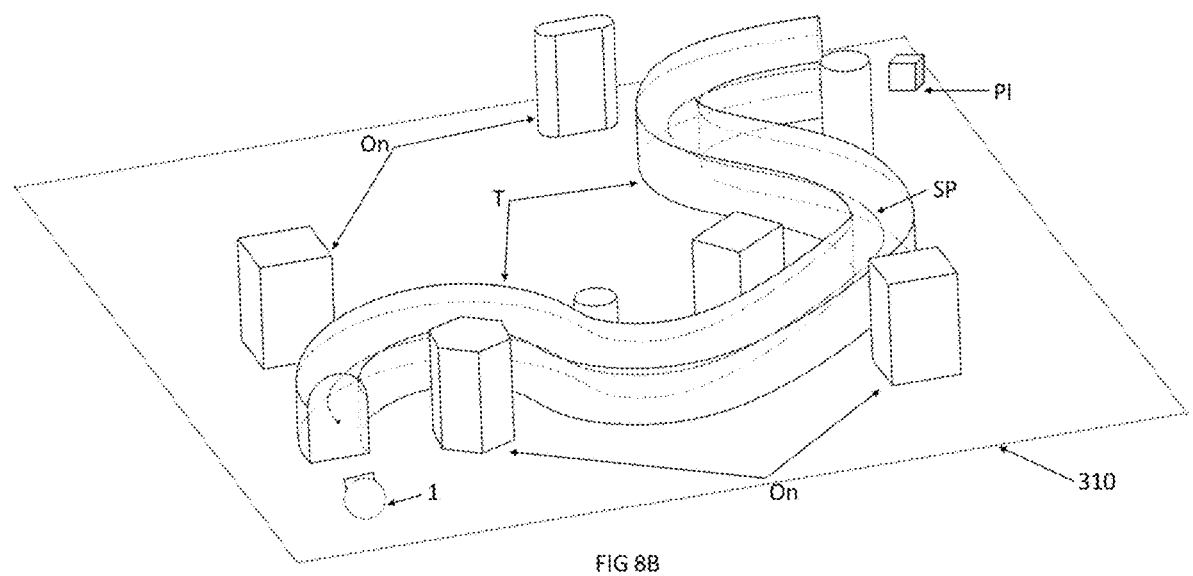

In one preferred embodiment, depicted in FIG. 8A and FIG. 8 B, the guiding mode comprises a three-dimensional walkable tunnel T defined as a virtual tunnel of predetermined cross-section, having as horizontal longitudinal axis the preferred navigation path SP. The guiding mode of S4 comprises specific haptic cues sent to the visually impaired user when the visually impaired user is approaching the virtual walls of the walkable tunnel T.

The three-dimensional walkable tunnel T is determined by the Navigation Manager sub-unit 33 at the same time with the preferred navigation path SP, and then sent to the Feedback Manager sub-unit 35 together with the haptic cues.

The advantage of the walkable tunnel T is that it allows a more comfortable navigation of the visually impaired user with a larger degree of liberty to the left and to the right defined by the virtual walls of the walkable tunnel T.

The guiding cues are transmitted when the visually impaired user is reaching the virtual walls of the walkable tunnel T so that he returns within the space defined virtual walls of the walkable tunnel T. In some embodiments, apart from the guiding cues signalling the virtual walls of the walkable tunnel T, other guiding cues are transmitted to confirm that the visually impaired user is navigating safely within the virtual walls of the walkable tunnel T.

The cross-section of the walkable tunnel T is predetermined depending on the plurality of the possible cross-sections along the preferred navigation path SP and on the visually impaired user's preferences.

The example No. 1 details the guiding modes using the walkable tunnel T.

Figure 9:
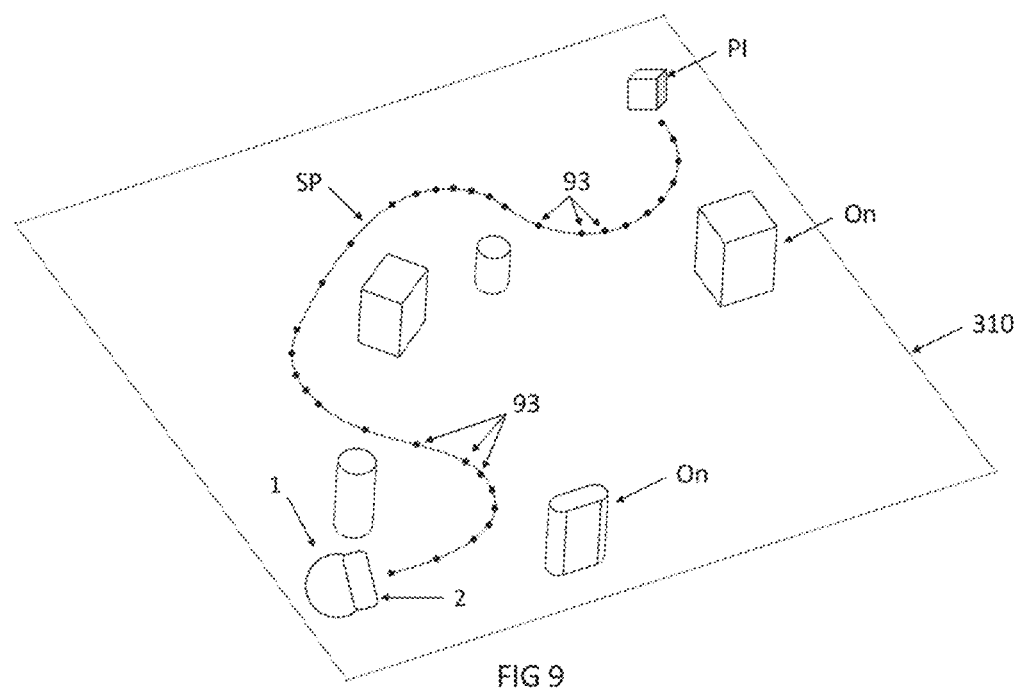

In another preferred embodiment, with reference to FIG. 9, the preferred navigation path SP is divided into predetermined segments delimited by a plurality of milestones 93. Each segment has at one end a current milestone 93 and at the other end a subsequent milestone 93. The words "next" and "subsequent" have the same meaning.

The guiding mode of S4 comprises haptic cues and/or auditory cues signalling the position of a next milestone 93 providing associated navigation guiding instructions to the visually impaired user from a current milestone 93 to the subsequent milestone 93. When the visually impaired user has already passed the subsequent milestone 93, said subsequent milestone 93 becomes the current milestone 93 and so on.

The length of the predetermined segments varies depending on the complexity and length of the preferred navigation path SP.

The length of each segment between two consecutive milestones 93 is inversely proportional with the predetermined preferred navigation path complexity criteria: the more complex the preferred navigation path SP, the shorter each segment. The milestones 93 are more frequent in the portions that contain change of direction in either horizontal or vertical plane than in the portions of going straight.

The length of each segment between two consecutive milestones 93 is determined by applying the predetermined preferred navigation path SP complexity criteria, which means that the length of the segments along the preferred navigation path SP is not necessarily equal, as seen in FIG. 9.

The length of each segment can be calculated using scores corresponding to said predetermined preferred navigation path complexity criteria or can be adapted dynamically for using artificial intelligence-based learning methods. For example, if the visually impaired user has some preferred navigation paths SP that are repetitive and he selects guiding method by using milestones as favourite, it is convenient to use said learning methods to adapt dynamically the length of the milestones.

The cues used in the guiding mode from the current milestone 93 to the subsequent milestone 93 are:
haptic cues,
auditory cues, or
haptic and auditory cues.

A non-limiting example of using the haptic cues is as follows:
the first, the seventh, the eighth cues are temporal.
the second and the third cues are spatiotemporal signalling if the visually impaired user is away from the preferred navigation path SP,
the fourth cue is spatiotemporal signalling the next milestone 93 when going forward,
the fifth and the sixth are spatiotemporal signalling the next milestone 93 defined in this case as the place where the visually impaired user must reorient his direction of movement on the horizontal or, respectively, vertical plane, The variation of the duration, periodicity, intensity or frequency of the vibration of the haptic pattern cues is directly proportional to the predetermined preferred navigation path complexity criteria and at the same time they vary inversely proportional to the distance left until the subsequent milestone 93.

A non-limiting example of using the auditory cues is as follows:
the first, the seventh, the eighth cues are simple sounds,
all the other cues are spatialized sounds. The auditory feedback actuators 42 repeatedly output the location in space of said subsequent milestone 93 using the spatialized sound heard from the position of said subsequent milestone 93 until the visually impaired user has reached said subsequent milestone 93. Once each milestone 93 reached, its spatialized sound is no longer heard, it becomes the current milestone 93 and the spatialized sound corresponding to the subsequent milestone 93 starts to be heard and so on.

The spatialized sounds vary directly proportional in frequencies, duration, repetition, intensity, and 3D spatial virtualization according to the predetermined preferred navigation path complexity criteria and at the same time they vary inversely proportional to the distance left until the subsequent milestone 93.

Using only auditory cues is advantageous in the situation when there is only one subsequent milestone 93 that coincides with the point of interest PI: for example, if the visually impaired user needs to go from the sofa to the kitchen, in this case the kitchen being the only one subsequent milestone 93. The spatialized auditory cue corresponds in this case to the kitchen. Using auditory cues has the advantage of simplicity and predictability, because it provides the visually impaired user the possibility to associate the distance left to be navigated until the subsequent milestone 93 with the corresponding auditory cue heard from the position of said subsequent milestone 93, which improves his degree of orientation and feeling of safety when navigating. Using only auditory cues is preferred when the point of interest PI is known to the visually impaired user and the distance to be travelled until the point of interest PI is short, for example for the navigation paths inside the house.

When the guiding mode from the current milestone 93 to the subsequent milestone 93 is by haptic and auditory cues, one between said haptic and auditory cues may be defined as primary and the other one as secondary, the secondary outputting cues only in special predetermined situation, such as for example the seventh cue instructing to stop and resume.

Figure 10:
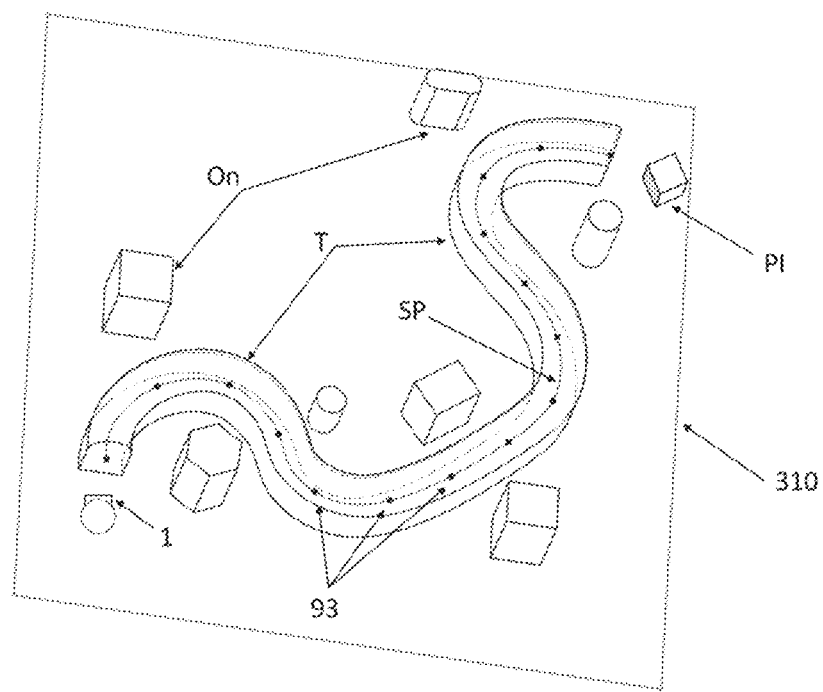
FIG. 10 Schematic representation of the embodiment showing guiding mode by using the walking tunnel T and the milestones 93

In another preferred embodiment, with reference to FIG. 10, it is possible to combine the haptic cues of the guiding mode using the walking tunnel T with the auditory cues of the guiding mode from the current milestone 93 to the subsequent milestone 93. The associated navigation guiding instructions sent by haptic cues aim to keep the visually impaired user on the preferred navigation path SP and within the limits of the walkable tunnel T, whereas the auditory cues enable the visually impaired user to estimate the distance left to be navigated until the next milestone 93.

Combining the two guiding modes has the advantage of combining the advantage of each of the guiding modes: the comfort and the safety of the walking tunnel with the simplicity and predictability of the guiding mode from the current milestone 93 to the subsequent milestone 93.

In another preferred embodiment, the guiding mode of S4 consists in haptic cues or auditory cues or haptic and auditory cues signalling the direction on the preferred navigation path SP.

A non-limiting example of using the haptic cues is as follows:
the first, the seventh, the eighth cues are temporal.
the second and the third cues are spatiotemporal signalling if the visually impaired user is away from the preferred navigation path SP,
the fourth cue is spatiotemporal signalling the direction forward,
the fifth and the sixth cues are spatiotemporal signalling the direction in which the visually impaired user must reorient his direction of movement on the horizontal or, respectively, vertical plane.

The haptic pattern cues are predetermined such that they give the impression to the visually impaired user to be dragged by his forehead constantly towards the direction in which he moves by a person standing in front of him.

A non-limiting example of using the auditory cues is as follows:
the first, the seventh, the eighth cues are simple sounds, all the other cues are spatialized sounds.

The spatialized sounds vary directly proportional in frequencies, duration, repetition, intensity, or 3D spatial virtualization according to the predetermined preferred navigation path complexity criteria. The visually impaired person, when navigating, follows the direction of the spatialized sound source S.

The main difference between the guiding mode based on signalling the direction on the preferred navigation path SP and based on the guiding mode from the current milestone 93 to the subsequent milestone 93 refers to the variation of the features of the haptic pattern cues, and respectively spatialized sounds:
in both guiding modes the haptic pattern cues, and respectively spatialized sounds vary directly proportional according to the predetermined preferred navigation path complexity criteria,
in case of the guiding mode from the current milestone 93 to the subsequent milestone 93 there is an additional variation related to the distance to the subsequent milestone 93, that does not exist in the guiding mode based on signalling the direction on the preferred navigation path SP depending on the distance to the subsequent milestone 93.

The use of haptic cues or auditory cues signalling the direction on the preferred navigation path SP is advantageous to be used in situations when the degree of complexity of the preferred navigation path SP is lower than in the case of using the guiding mode from the current milestone 93 to the subsequent milestone 93 or the guiding mode of the walking tunnel T. One such example is when the same preferred navigation paths SP are used frequently. The advantage of the use haptic cues or auditory cues signalling the direction on the preferred navigation path SP is that they produce less fatigue to the visually impaired user.

Figures 11A, 11B:
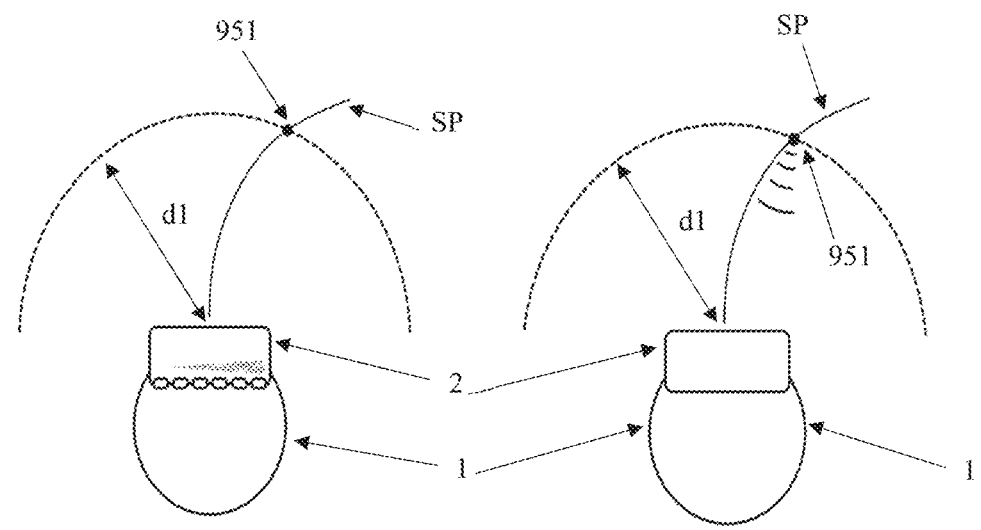
FIG. 11A Schematic representation of the embodiment showing guiding mode by using haptic cues FIG. 11B Schematic representation of the embodiment showing guiding mode by using auditory cues FIG. 12 Schematic representation of the embodiment showing guiding mode by using spatialized sounds originating from the spatialized sound source S that virtually travels along the preferred navigation path SP FIG. 13 Schematic representations of the embodiment corresponding to the wearable device 1 that comprises two additional sensors 25 and 26.

One non-limiting example of using haptic cues signalling the direction on the preferred navigation path SP is given in FIG. 11A. In this example, firstly is determining the way of signalling the direction on the preferred navigation path SP by intersecting the preferred navigation path SP with a circle having the origin the position of the Sensory unit 2 and a radius r with predetermined length gets an intersection 94. The imaginary line connecting the origin of the Sensory unit 2 with the intersection 94 gives the direction to be followed by the visually impaired user, said direction being transmitted to him by said haptic cues or audio cues. The predetermined length of the radius r is set depending on the degree of complexity of the preferred navigation path SP.

In another non-limiting example of using auditory cues signalling the direction on the preferred navigation path SP is given in FIG. 11B. In this example, the direction to be followed is established in the same way as in the example of FIG. 11A.

The spatialized sound source S is placed at a predetermined first distance d1 of the spatialized sound source S in respect to the Sensory unit 2.

In order to obtain flexibility in the guiding modes and to adapt said guiding modes to the degree of complexity of the preferred navigation path SP, the predetermined first distance d1 of the spatialized sound source S in respect to the Sensory unit 2 can be either smaller than the predetermined length of the radius r—as depicted in FIG. 11B, or can be equal to or greater than it.

It is possible to combine haptic cues with auditory cues, the combination not being represented graphically.

Figure 12:
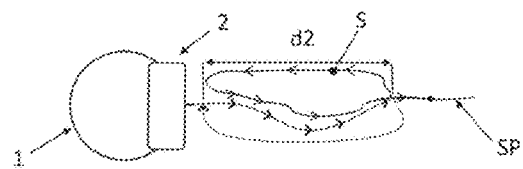

In another preferred embodiment, with reference to FIG. 12, the auditory cues are spatialized sounds originating from a spatialized sound source S that virtually travels along a predetermined second distance d2 on the preferred navigation path SP from the position of the sensory unit 2 until the spatialized sound source S reaches the end of the predetermined second distance d2 and back to the position of the sensory unit 2.

A non-limiting example of using the auditory cues is as follows:
the first, the seventh, the eighth cues are simple sounds, all the other cues are spatialized sounds.

The auditory feedback actuators 42 repeatedly output the spatialized sound source S by means of variation of the frequencies, duration, repetition, intensity, and 3D spatial virtualization directly proportional to the predetermined preferred navigation path complexity criteria.

The predetermined second distance d2 is inversely proportional to the predetermined preferred navigation path SP complexity criteria, that is the more complex the preferred navigation path SP is, the smaller the predetermined second distance d2.

The predetermined second distance d2 typically varies between 0.2 m and 5 m. If the preferred navigation path SP is very complex, the predetermined second distance d2 typically varies between 0.2 and 1 m. The examples of the values for the predetermined second distance d2 are given for illustration purpose only and shall not be considered as limiting.

Example: the predetermined second distance d2 is 1.2 m. This means that the spatialized sound source S is virtually travelling at 0.2 m from the position of the sensory unit 2. The spatialized sounds travel back and forth from the position of the sensory unit 2 until they reach 1,2 m in the direction of navigation and then they come back to the position of the sensory unit 2. As the speed of the sound is significantly higher than the speed of human walk, the visually impaired user receives the navigating guiding instructions in more detail than in any other guiding mode disclosed in this invention, because in the guiding mode using the virtual travel of the spatialized sounds the sounds travel independently from the visually impaired user.

The features of the sounds, namely any between frequencies, duration, repetition, intensity, and 3D spatial virtualization or combinations of them, vary inversely proportional with the distance left until the predetermined second distance d2. For example, the auditory cues are more frequent and/or more intense and/or more 3D spatially virtualized or last longer when the spatialized sound source S is at 0.1 m than when the spatialized sound source S is at 0.2 m.

The advantage of this guiding mode is that it allows a fine tuning of the navigation which makes it advantageous in environments where the walkable area WA is very narrow and, consequently, the preferred navigation path SP looks like a slalom between the objects On and the living beings Ln.

In a second aspect of the invention, the wearable device 1 comprises the Sensory unit 2, the Processing and control unit 3, the Feedback unit 4, the User commands interface 5.

The wearable device 1 comprises two hardware units not represented graphically: the Power storage unit 6, and the memory M.

The term "memory M" shall be understood as designating a plurality of non-volatile memories either grouped together in a single distinctive hardware unit or spread in each of the other hardware units.

The memory M is configured to store at least the Live Map 310, all the algorithms, all the criteria and requirements and the preferences of the visually impaired user such as but not limited to the type of cues he prefers for receiving the guiding instructions. The storage is carried out according to prior art.

The wearable device 1 is, in a preferred embodiment, a single-component device, whereas in other preferred embodiments is a multi-component device.

In case of the single-component device 1, all the hardware units are included in the wearable device 1 as shown in FIG. 2B. The wearable device 1 is mounted on the head, not represented graphically. The positioning of the hardware units on the head of the visually impaired user can be, for example, in the form of a headband that has the advantage of providing good support and anchor for all the hardware units.

In case of the preferred embodiments of the multi-component device 1, with reference to FIG. 2A 1 and FIG. 2A 2, FIG. 6 and FIG. 7, one of the components is a headset component 11 comprising the Sensory unit 2, and the Feedback unit 4. The headset component 11 can be, for example in the form of a headband, as shown FIG. 2A 1, FIG. 2A 2 and FIG. 2B.

Two non-limiting examples of the preferred embodiments of the multi-component device 1 depict two components:
the headset component 11, and
a belt-worn component 12, or, respectively, a wrist component 12. The wrist component 12 is not represented graphically.

In this case, the belt-worn component 12, or, respectively, the wrist component 12 comprises the processing and control unit 3, the User commands interface 5, and the power storage unit 6. The memory M can be comprised in any of the two components or spread among them.

FIG. 2A 1 and FIG. 2A 2, depicts the preferred embodiment of the two-component device 1 having the headset component 11 and the belt-worn component 12.

The division of the components among the headset component 11 and the belt-worn component 12, or, respectively, the wrist component 12 is mainly based on the size and weights of the units.

The advantage of using the single-component device 1 is that its preferred location on the head produces a sensorial experience for the visually impaired user of the wearable device 1 very close to the sensorial experience of the non-visually impaired person, being close to the position of the ears which enables hearing the auditory cues.

However, in some cases, some hardware units, such as the Processing and control unit 3 and/or the Power storage unit 6 may be heavy and bulky. In these cases, the multiple-component device 1 has the advantage of placing the heavy and bulky hardware units in other locations of the body such as but not limited to the belt or the wrist.

As the technology evolves in general towards miniaturization of hardware units, this will lead to increase the possibility of using the single-component device 1 without placing too much burden on the head of the visually impaired user.

In another preferred embodiment, not represented graphically, there are three components:
The headset component 11 comprising the Sensory unit 2, the Feedback unit 4,
The belt-worn component 12, or, respectively, the wrist component 12 comprises the processing and control unit 3, the power storage unit 6,
A hand-held component 13, not represented graphically, comprising the User commands interface 5, The memory M can be comprised in any of the headset component 11 or the belt-worn component 12, or, respectively, the wrist component 12 or spread among the two.

The configuration of the various units composing the wearable device 1 in order to work the invention is not influenced by the positioning of said hardware units in the one—or, respectively multiple-component device to the various parts of the human body.

The hardware units communicate between themselves either by wired communication protocols or by wireless communication protocol, or by a combination of wired and wireless protocols, said communication taking place according to prior art.

The Sensory Unit 2

The Sensory unit 2 has means configured to collect data regarding the environment of the visually impaired user.

The data collected by the Sensory unit 2 refers to multiple characteristics of objects On and living beings Ln that are generally identified by a human of good sensory capabilities including good vision. The data, as collected by the Sensory unit 2, reflects the complexity of the environment with more accuracy than in the state of art.

To satisfy the aim of collecting more accurate data, the Sensory unit 2 requires a combination of sensors of multiple types that will be described in detail. It shall be understood that all examples of sensors are for a better understanding of the teaching of the invention and shall not limit the invention.

The Sensory unit 2 comprises four basic sensors: a Camera 21, a Depth sensor 22, a Inertial Measurement unit 23 and a Sound localisation sensor 24.

The best position of the Camera 21, the Depth sensor 22, and the Inertial Measurement unit 23—irrespective of whether the wearable device 1 is a single-component or a multi-component device, is on the forehead as shown in FIG. 2A 1, FIG. 2A 2 and FIG. 2B. The reasons for the preferred location the Sensory unit 2 on the forehead are threefold: i) because the human beings—visually impaired or not, in the absence of any device, are accustomed to move the head when receiving cues, such as sounds or haptic cues, ii) because the forehead is not currently used for other devices or tasks, and iii) because the best field of view for the Camera 21 and for the Depth Sensor 22 is on the forehead.

The configuration of the positioning of the Sensory unit 2 on the forehead of the visually impaired user must ensure that the field of view 20 includes:
- the feet of the visually impaired user,
- the components of the free area A in the immediate proximity of the feet,
- the immediate steps of the visually impaired user, The first sensor is the Camera 21. The term "Camera 21" designates throughout the invention, one or several digital video cameras. The invention requires to have at least digital video camera.

The Camera 21 is configured to acquire 2D images from a Camera field of view, and to send the acquired 2D images to the Localisation module 301, to the Walkable Area Detection module 302, and to the Object 2D Characteristics Extraction module 306.

The term "images" encompasses the static images as well as the videos, depending on the frame rate of acquisition of the images of the Camera 21.

The images acquired by the Camera 21 refer to the visual characteristics of the plurality of objects On and of the plurality of living beings Ln such as aspect; category—e.g. trees cars; colour, shape, dimensions as well as the components of the free area A.

Non-limiting examples of Camera 21 include: HD Camera, having minimum video resolution 1280 pixels×720 pixels, VGA Camera, having minimum video resolution 320 pixels×240 pixels, The minimum requirements of the Camera 21 are as follows:
- the horizontal field of view between at least 50° and up to 180°, the larger the better because it provides information from a larger area, and
- the vertical field of view between at least 60° and up to 180° the larger the better because it provides information from a larger area.

The Camera 21 can be RGB Camera or not. The RGB features help to provide more accurate information from the Camera field of view.

The more complex the Camera is, the more information will contain the 2D images acquired by the Camera.

The second sensor is the Depth sensor 22. The term "Depth sensor 22" designates throughout the invention one or several depth sensors. The invention requires to have at least one depth sensor.

The Depth sensor 22 is configured to acquire 3D point clouds data corresponding to 3D distance position and dimension for each of the objects On and each of the living beings Ln placed in the Depth sensor field of view as a continuous point cloud, and to send them to the Localisation module 301, to the Walkable Area Detection module 302, and to the Object 3D Characteristics Fusion module 307.

The 3D point cloud data acquired by the Depth sensor 22 refers to the 3-D physical characteristics of the objects On and the living beings Ln such as density, volume, etc.

Non-limiting examples of Depth sensor 22 are stereoscopic camera, radar, Lidar, ultrasonic sensor, mmWave radar sensor. Using mmWave radar sensor is advantageous because it is able to sense the pulse or the breath of the living beings Ln, even when the living beings Ln are moving which brings additional information for the visually impaired user.

It is possible to combine the Camera 21 and the Depth Sensor 22 in a single sensor Camera and Depth Sensor 21-22. The advantage is reducing the size and weight of the two afore-mentioned sensors by using only one sensor configured to carry out the tasks of the two sensors. One non-limiting example of Camera and Depth Sensor 21-22 would be a time of flight TOF camera. The third sensor is the Inertial Measurement unit 23. The term "Inertial Measurement unit 23" designates throughout the invention an ensemble made of at least one accelerometer and at least one gyroscope and, either as separate sensors, or combined sensor. It is preferable to add at least one magnetometer for better accuracy, either as a separate sensor or combining it with the at least accelerometer and/or the at least gyroscope. It is better to use combined sensors because of the need to reduce the size and weight of the ensemble. The invention requires to have at least one inertial measurement unit.

The Inertial Measurement unit 23 is configured to determine the orientation of the Sensory unit 2, and to send the determined orientation to the Localisation module 301, and to the Characteristics Fusion module 307 by means of the Orientation Computation module 303.

Since the Sensory unit 2 is placed on the forehead of the visually impaired user, the information acquired by the Inertial Measurement unit 23 implicitly refers to orientation of the head of the visually impaired user in respect to the ground.

The fourth sensor is the Sound localisation sensor 24.

The term "Sound localisation sensor 24" designates throughout the invention an ensemble of one or several sensors used to determine the source of various sounds in the three-dimensional space usually by the direction of the incoming sound waves and the distance between the source and sensor(s).

The Sound localisation sensor 24 is configured to acquire a plurality of sound streams in the three-dimensional space emitted by the objects On and the living beings Ln, and to send them to the Sound Direction Localisation module 304.

The information acquired by the Sound localisation sensor 24 refers to the sounds emitted by the objects On and the living beings Ln, including the directionality of said sounds. The coverage of the environment by the Sound localisation sensor 24 is defined by its beam pattern.

A non-limiting example of sound localisation sensor is a microphone array. The minimum number of microphone arrays used for the Sound localisation sensor 24 must be such that the sum of the beam pattern equals to the angle of the field of view 20. The maximum number of microphone arrays used for the Sound localisation sensor 24 covers 360°. The microphone arrays are positioned within the headset such that the sum of their beam pattern be comprised between the angle of the field of view 20 and 360°.

The basic sensors receive from the Sensory fusion sub-unit 30 of the Processing and control unit 3 specific configurations, including the correlation of the respective field of views of the Camera 21, Depth sensor 22, with the range of measurement of the Inertial Measurement unit 23 and the beam pattern of the Sound localisation sensor 24.

Said correlation has as result the field of view of the basic sensors 20, depicted schematically in FIG. 3A and FIG. 3B. The concept of the field of view of the basic sensors 20 does not mean all basic sensors have exactly the same range. It should be understood as the area where all the basic sensors have perception, similarly with the concept of the common denominator in mathematics. Typically, the field of view of the basic sensors 20 faces forward.

However, the Sound localisation sensor 24 may have a wider range that the field of view of the basic sensors 20, for example when the number of microphone arrays is such that the sum of the beam pattern equals to 360°. This is advantageous because it allows gathering sound information originating from the back of the visually impaired user.

Figure 13:
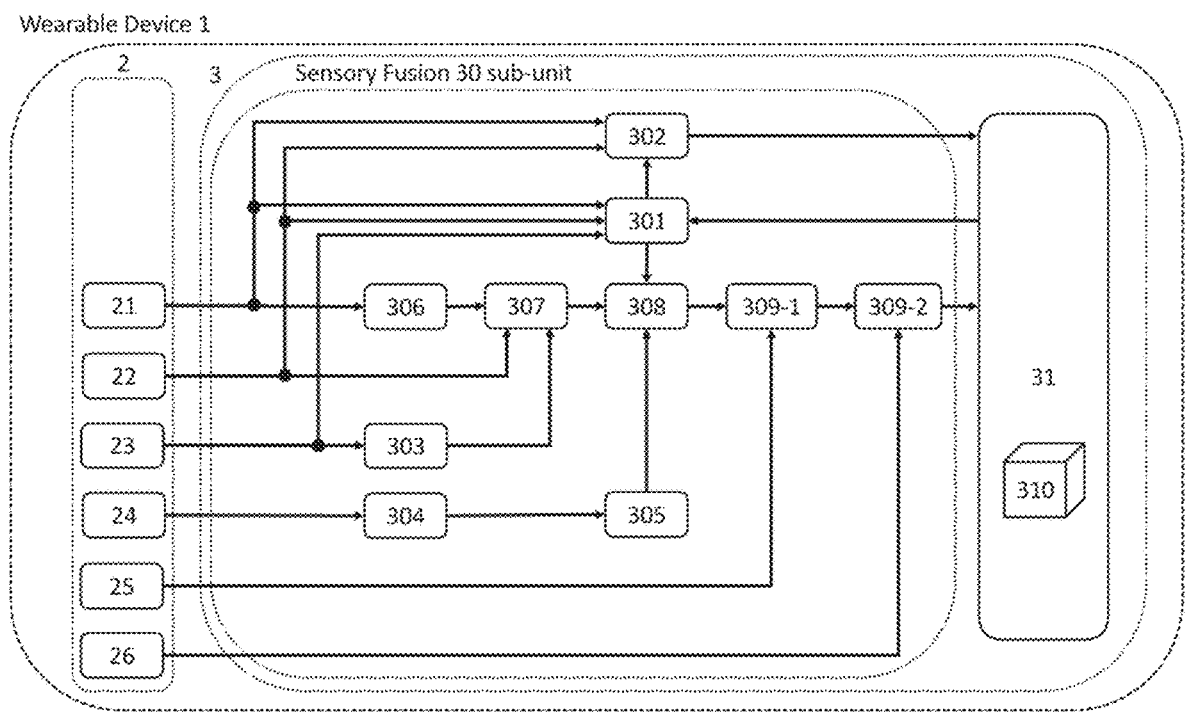

In another preferred embodiment, depicted in FIG. 13, it is possible to provide more information about the environment of the visually impaired user by adding one or both additional sensors: a Global positioning sensor 25, and a Temperature sensor 26.

Any combination of each of the additional sensors with the group of basic sensors has the advantage of providing additional information to the Processing and control unit 3 which leads to a more accurate and detailed Live Map 310.

Each of the two additional sensors has a corresponding module in the Sensory Fusion sub-unit 30, as follows:

The Global positioning sensor 25 is configured to determine the absolute position of the Sensory unit 2 and to send the determination to a Relative to Absolute Conversion module 309-1 that converts the relative position of the Sensory Unit 2 into absolute position, thus the position of the objects On and the position of the living beings Ln is expressed as absolute position.

The best position of the Global positioning sensor 25 is on the top of the headset component 11 of the wearable device 1 in case of multi-component device, respectively on the top of the wearable device 1 in case of single component device.

In the absence of the Global positioning sensor 25, the Sensory Fusion sub-unit 30 determines the relative position of the wearable device 1 in respect to each of the objects On and to each of the living beings Ln.

The Temperature sensor 26 is configured to determine the temperature of the objects On and of the living beings Ln, and to send the determined temperature to an Object Temperature Characteristics fusion module 309-2.

In case of using either of the additional sensors, the data outputted by the Object Sound Characteristics Fusion module 308 is sent to either the Relative to Absolute Conversion module 309-1 or the Object Temperature Characteristics fusion module 309-2 respectively, fused with the data sent by the respective sensor and the outcome is sent to the Live Map sub-unit 31.

In case of using both additional sensors, as depicted in FIG. 13, the data outputted by the Object Sound Characteristics Fusion module 308 is sent to the Relative to Absolute Conversion module 309-1, fused with the data from the Global positioning sensor 25, then the outcome is sent to the Object Temperature Characteristics fusion module 309-2 fused with the data sent by the Temperature sensor 26 and the outcome is sent to the Live Map sub-unit 31.

The Processing and Control Unit 3

The Processing and control unit 3 is a computing unit, comprising at least one processor and at least one non-volatile memory, such as but not limited to a microcontroller, a computer, a supercomputer. The term "computing unit" encompasses a single computing unit or a plurality of computing units located remotely from one another communicating within a computer communication system.

The Processing and control unit 3 comprises: the Sensory fusion sub-unit 30, the Live Map sub-unit 31, the Relationship Manager sub-unit 32, the Navigation Manager sub-unit 33, the User commands interface Manager sub-unit 34, the Feedback Manager sub-unit 35, and the Sound representation sub-unit 36.

With reference to FIG. 5, the Sensory fusion sub-unit 30 comprises means configured to fuse and correlate the determinations received from the four basic sensors of the Sensory unit 2.

With reference to FIG. 13, the Sensory fusion sub-unit 30 comprises means configured to fuse and correlate the determinations received from the four basic sensors of the Sensory unit 2 and from either or both additional sensors.

The Localisation module 301 comprises means configured to localize the current position and orientation of the sensory unit 2 of the wearable device 1 and of the plurality of the objects On and living beings Ln in respect to the sensory unit 2, in 3D coordinates, on the current Live Map 310 by means of localisation algorithms applied to the data acquired from the Camera 21, the Depth sensor 22, the Inertial Measurement unit 23 of the Sensory unit 2.

The Localisation module 301 further comprises means configured to send the localisation of the position and orientation of the sensory unit 2 to the Walkable Area Detection module 302, thus updating the Live Map 310 content as outputted from S 2.2 with the layer referring to the localisation data of the position and orientation of the sensory unit 2 in respect to the plurality of the objects On, and, respectively to the plurality of living beings Ln.

The Walkable Area Detection module 302 comprises means configured to receive the data acquired from the Camera 21, the Depth sensor 22, and means configured to receive data from the Localisation module 301, and, based on both sources of data, means configured to define the walkable area WA, and the conditional walkable area CWA, and send them to the Live Map sub-unit 31, by applying the set of permanent predetermined walkable area requirements and predictable conditional walkable area requirements, stored in the memory M.

The Orientation Computation module 303 comprises means configured to determine the orientation of the wearable device 1 based on the inertial data provided by the Inertial Measurement unit 23, and to sends the determinations to Object 3D Characteristics Fusion module 307.

The Sound Direction Localisation module 304 comprises means configured to determine the direction of the plurality of sound streams expressed in 3D coordinates emitted respectively by each of the plurality of the objects On and the plurality of living beings Ln based on the data received from the Sound localisation sensor 24 and means configured to send the determined direction to the Sound Classification module 305.

The Sound Classification module 305 comprises means configured to classify into sound types the plurality of sound streams received from the Sound Direction Localisation module 304 and to send the classified sound types to the Object Sound Characteristics Fusion module 308. The means configured to classify into sound types the plurality of sound streams typically use artificial intelligence algorithms.

The Object 2D Characteristics Extraction module 306 comprises means configured to provide the pixel-wise segmentation of the 2D images acquired from the Camera 21, to detect in the pixel-wise segmented 2D images each object On of the plurality of the objects On, and each living being Ln of the plurality of living beings Ln placed in the field of view 20, to determine their respective position in 2D coordinates, and their respective physical characteristics and to send the determinations to the Object 3D Characteristics Fusion module 307.

The Object 3D Characteristics Fusion module 307 comprises means configured to receive data from the Object 2D Characteristics Extraction module 306, from the Orientation Computation module 303 and from the Depth sensor 22, and to determine:
- the position in 3D coordinates of each of the objects On in respect to the Sensory unit 2, and their orientation in respect to the Sensory unit 2, and the future position at predetermined moments in time based on the vector of movements, respectively.
- the physical characteristics of the plurality of the objects On, such as dimensions, composition, structure, colour, shape, humidity, temperature, degree of occupancy, degree of cleanliness, degree of usage, degree of wear, degree of stability, degree of fullness, degree of danger,
- the position of each of the living beings Ln in 3D coordinates, their physical characteristics, like height, and skeleton pose orientation, as well as the prediction of their future position in the predetermined unit of time based on the vector of movement,
- the current activity and mood status of each of the living beings Ln based on skeleton pose orientation, and their physical characteristics.

The Object Sound Characteristics Fusion module 308 comprises means configured to add acoustical characteristics to each of the plurality of the objects On and the living beings Ln for which the 3D coordinates have been determined based on the classified sound streams types determined by the Sound Classification module 305 by associating with the detected objects On and the living beings Ln and send all data to the Live Map sub-unit 31.

In an embodiment of the present invention, the Sensory fusion sub-unit 30 further comprises the Relative to Absolute Conversion module 309-1. This module comprises means configured to convert the relative position of the Sensory Unit 2 into absolute position, to fuse the data from the Object Sound Characteristics Fusion module 308 with the data regarding absolute position of the Sensory unit 2 and to send the determinations to the Live Map sub-unit 31 either directly or by means of the Object Temperature Characteristics fusion module 309-2.

In another embodiment of the present invention, the Sensory fusion sub-unit 30 further comprises the Object Temperature Characteristics fusion module 309-2. This module comprises means configured to determine the temperature of the detected objects On and the living beings Ln, to fuse the data from the Object Sound Characteristics Fusion module 308 with the data regarding the temperature of the objects On and of the living beings Ln and to send the fused data to the Live map sub-unit 31. If the Relative to Absolute Conversion module 309-1 is used, it sends the data to the Object Temperature Characteristics fusion module 309-2 and finally fuses the data with the data regarding the temperature of the objects On and of the living beings Ln.

According to the invention, the Live Map sub-unit 31 comprises means configured to create, repeatedly update and store the Live Map 310 and means to receive data referring the components of the free area A and the updated Live Map 310 content as outputted from S 2.2 with the layer referring to the localisation of the position and orientation of the sensory unit 2 from the Walkable Area Detection module 302, data regarding each of the plurality of the objects On and the living beings Ln in 3D coordinates including acoustical characteristics from the Object Sound Characteristics Fusion module 308, and to send all Live map determinations to the Localisation module 301.

The Live Map sub-unit 31 comprises means configured to receive:
- The queries of the Live Map 310 by the Relationship Manager sub-unit 32,
- The queries of the Live Map 310 by the Navigation Manager sub-unit 33, including the query of the User commands interface Manager sub-unit 34 to the Navigation Manager sub-unit 33 if the point of interest PI is already in the Live Map 310,
- The updated relationships Rn carried out by the Relationship Manager sub-unit 32
- The updated components of the free area A carried out by the Navigation Manager sub-unit 33,
- The queries of the Sound representation module 36 regarding the specific information regarding the Objects On.

The Live Map sub-unit 31 comprises means configured to send:
- the plurality of relations Rn in response to the queries of the Live Map 310 by the Relationship Manager sub-unit 32,
- the components of the free area A in response to the queries of the Navigation Manager sub-unit 33,
- all Live map determinations to Navigation Manager sub-unit 33 in response to the queries of it, The Relationship Manager sub-unit 32 comprises means configured to query the Live Map 310 and to import the most recently updated data from the Live Map 310 as a result of querying. Said most recently updated data refers to:
- the plurality of objects On,
- the plurality of living beings Ln,
- the conditional walkable area CWA, because the some of the objects On and/or some of the living beings Ln are related to said conditional walkable area CWA e.g. the traffic light, or the dog,
- the existing relationships Rn prior to the query.

Further on, the Relationship Manager sub-unit 32 comprises means configured to carry out computations for determining and updating the relations between the plurality of objects On and/or the plurality of living beings Ln, and to send the updated relations as result of the computations to the Live map sub-unit 31 to store same in the Live Map 310.

The Navigation Manager sub-unit 33 comprises means configured to:
- determine, repeatedly update and store in the memory M, of at least one navigation path Pn,
- repeatedly select the preferred navigation path SP from the at least one navigation path Pn,
- repeatedly send the preferred navigation path SP, together with the associated navigation guiding instructions, to the Feedback Manager sub-unit 35.
- receive from the User commands interface Manager sub-unit 34 the initiation requests, the selection requests and the information requests.
- query the Live Map 310 for the Live Map determinations based on fused data received from the Sensory Fusion sub-unit 30 and the components of the free area A: walkable area WA, conditional walkable area CWA and non-walkable area NA and to receive from the Live Map sub-unit 31 the response corresponding to each query.

receive the query of the User commands interface Manager sub-unit 34 if the point of interest PI is already in the Live Map 310, verify if the at least two navigation path requirements are met.

send to the Feedback Manager sub-unit 35 the associated navigation guiding instruction associated to said at least one predictable conditional walkable area requirement.

The User commands interface Manager sub-unit 34 comprises means configured to receive requests and selections that the visually impaired user makes by means of the User commands interface 5 and to transmit them to the Navigation Manager sub-unit 33 and means configured to send selected guiding modes to The Feedback Manager sub-unit 35.

The User commands interface Manager sub-unit 34 further comprises means for receiving requests from the visually impaired user for sound representation of a specific category of objects On or a specific category of living beings Ln from the Live Map 310.

The Feedback Manager sub-unit 35 comprises means configured to guide the visually impaired person along the preferred navigation path SP by receiving the guiding instructions from the Navigation Manager sub-unit 33 together with selected guiding modes from the User commands interface Manager sub-unit 34 and means configured to transmit the corresponding associated guiding instructions to the Feedback unit 4, and further comprises means for sending the sound representation regarding a specific category of objects On or a specific category of living beings Ln.

In the embodiments where the Sound representation sub-unit 36 is a self-contained sub-unit and a sub-unit of the Navigation Manager sub-unit 33, the Feedback Manager sub-unit 35 further comprises means for receiving sound representation of the specific category of objects On or a specific category of living beings Ln from the Sound representation sub-unit 36.

The Sound representation sub-unit 36 comprises means configured to receive requests from the visually impaired and to extract from the Live Map 310 of the corresponding information regarding a specific category of objects On or a specific category of living beings Ln and means for representing the extracted information as corresponding spatialized sounds and transmitting same to the Feedback Unit 4.

The Feedback unit 4, configured to be placed on the head of the visually impaired user, comprises means configured to guide the visually impaired user along the preferred navigation path SP by receiving the associated guiding instructions from the Feedback Manager sub-unit 35 and by sending the haptic and/or auditory cues to the visually impaired person as it was described in detail in the section regarding the details of the step 4 of the method, and comprises means for sending to the visually impaired user the sound representation the specific category of objects On or a specific category of living beings Ln.

The User commands interface 5, configured to be placed on the head of the visually impaired user, comprises means configured to receive from the visually impaired user the requests, namely the initiation request, the selection request and the information request and the selections of the guiding modes and to send them to the User commands interface Manager sub-unit 34.

Non limiting examples of the User commands interface 5 are as follows:

User commands haptic means 51, e.g., buttons used for simple requests corresponding to frequent predetermined points of interest PI. For example, a first button can be named "home" corresponding to the door of the entrance to the home where the visually impaired person lives, a second button can be named "bathroom", a third button can be named "kitchen", etc. The buttons can be analogues or digital.

User commands audio means 52, e.g., microphones for the points of interest PI that are not frequent. The user commands audio means include speech recognition means and means to transform the words of the visually impaired user into instructions sent to the User commands interface Manager sub-unit 34. Taking the same example with the room with four windows, the visually impaired person says "window" to the microphones 52 and all four windows of the room are represented in sounds.

The communication of the User commands interface 5 with the visually impaired person and with User commands interface Manager sub-unit 34 is according to prior art.

The Power Storage Unit 6

The term "Power storage unit 6" shall be understood as designating one or several batteries configured to power the other hardware units of the wearable device 1. The way the Power storage unit 6 powers said other hardware units of the wearable device 1 is carried out according to prior art.

The Communication unit 7 comprises means configured to download maps from the Internet, such as but not limited to the downloadable maps.

In a third aspect of the invention, it is provided a computer program comprising instructions which, when the program is executed by the wearable device 1 causes the wearable device 1 to carry out the steps of the computer-implemented method for assisting the movement of a visually impaired user, in any of the preferred embodiments, including combinations thereof.

In a fourth aspect of the invention, it is provided a computer readable medium having stored thereon instructions which, when executed by the wearable device 1, causes the wearable device 1 to carry out the steps of the computer-implemented method, in any of the preferred embodiments, including combinations thereof.

In a fifth aspect of the invention, it is provided a non-transitory computer-readable storage device storing software comprising instructions executable by one or more computers which, upon such execution, cause the one or more computers to perform operations of the computer-implemented method, in any of the preferred embodiments, including combinations thereof.

In a sixth aspect of the invention, it is provided a system comprising one or more computers and one or more storage devices storing instructions that are operable, when executed by the one or more computers, to cause the one or more computers to perform operations of the computer-implemented method, in any of the preferred embodiments, including combinations thereof. The terms "computers" of the fifth and sixth aspects refer to a computing unit, comprising at least one processor and at least one non-volatile memory, such as but not limited to a microcontroller, a computer, a supercomputer. The term "computing unit" encompasses a single computing unit or a plurality of computing units located remotely from one another communicating within a computer communication system.

Example No. 1

The detailed description of the method is exemplified in a real-life scenario, with reference to the FIGS. 14, 15, 16, and 17. The person skilled in the art shall understand that the teaching of the invention is not limited to this example.

In the real-life scenario, the visually impaired person 1 is on the sidewalk of a street in the close proximity of the entrance to a building. He wants to get into the building thus has to navigate from his standpoint until the entrance door of the building and has also to find the doorbell of the entrance door.

This is a non-limiting example when the visually impaired user sends the initiation request in order to be guided to the entrance door of the building.

Figure 14:
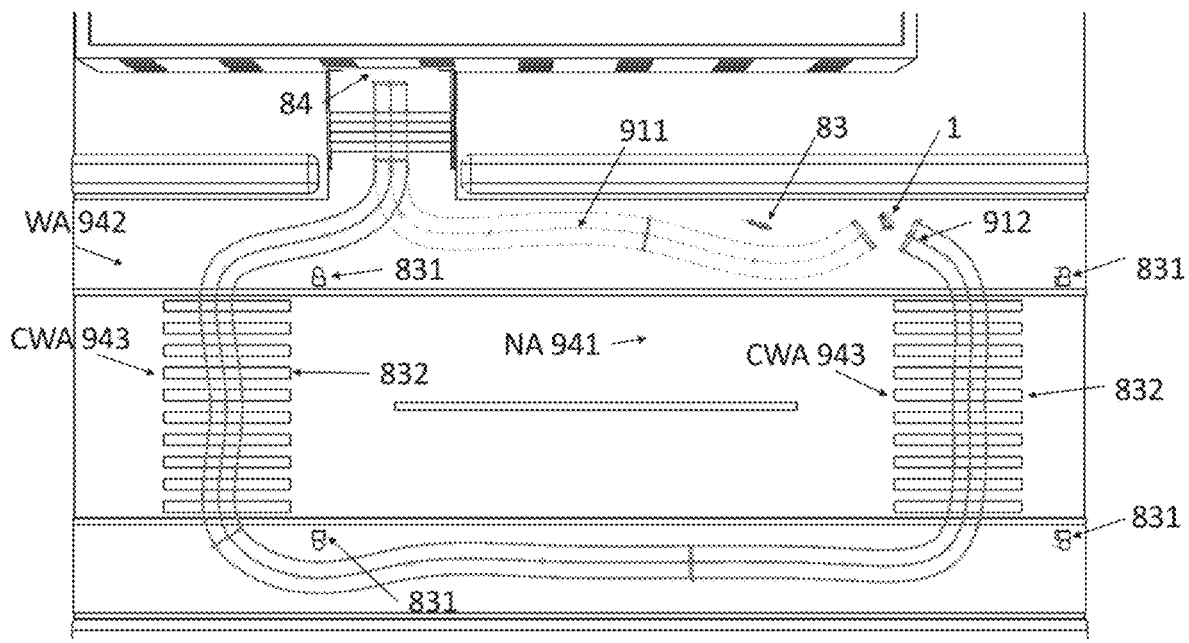
FIGS. 14 to 17 Exemplification of the method—Example No. 1
Figure 15:
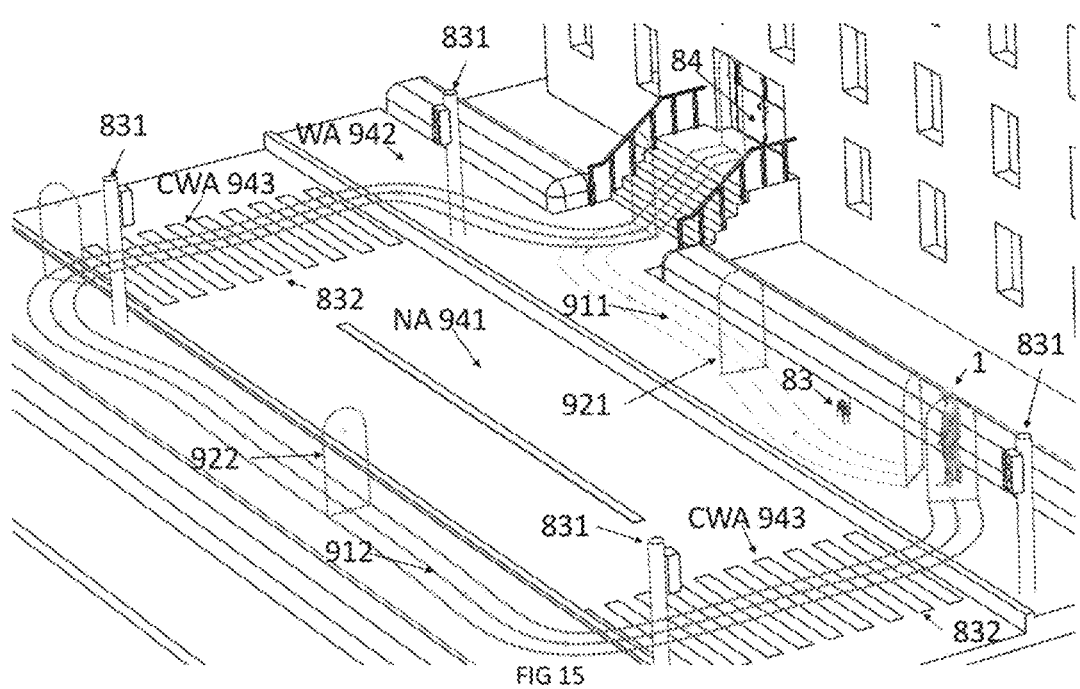

In FIG. 14 and FIG. 15 it is shown a portion of the Live Map 310 that includes:
- A building with its parts: each step, the fences, each of the two handrails, an entrance door 84 considered as an initial point of interest, with component parts such as a door lock, a door knob and a door bell 841, the doorbell 841 being considered a further point of interest.
- a dog 83 recognized as living being Ln.
- the walkable area WA 942, that includes the sidewalks and the stairs to the entrance in the building.
- the non-walkable area NA 941, that includes the street.
- the conditional walkable area 943: two pedestrian crossings 832 each one provided with a corresponding traffic light 831.

An example of the geometric predetermined walkable area requirements include: the height of the sidewalk must not exceed 7 cm, the distance to the fences must not exceed 0.5 m, the distance to the margins of the sidewalk must not exceed 0.5 m, the height of the virtual cuboid is 2.20 m, that is 40 cm more than the height of the visually impaired person that is 1.80 m. An example of static and dynamical physical relationships Rn is the relation created in the live map 310 by the Relationship Manager sub-unit 32 of the Processing and control unit 3 with respect to associating the colour of the traffic lights 831 to the conditional status of the conditional walkable area 943: if the colour is green, the area 943 is walkable whereas if the colour is red, the area 943 is non-walkable.

A non-limiting example for the conditional walkable area CWA is represented by the two pedestrian crossings 832 provided with traffic lights 831. The streets are defined as non-walkable area NA in the permanent predetermined walkable area requirements. When it comes to the pedestrian crossings 832, in case there are no traffic lights, they are predefined as walkable area 942, whereas in case there are traffic lights, they are predefined as conditional walkable area 943 that is they are walkable only when the colour of the traffic lights 831 is green. This is an example of at least one predictable conditional walkable area requirement, as colour of the traffic lights changes predictably changing from red to green and from green to red.

The visually impaired user 1 is on the sidewalk of the building when he sends the initiation request.

In several embodiments of the invention, the entrance door 84 is already in the Live Map 310 because it was added to it in the step 2 of the method in the past.

In the embodiment of the invention where said entrance door 84 is not yet in the Live Map 310 at the moment of sending the initiation request because the visually impaired user has just got off from a taxi to a completely new place and consequently the entrance door 84 was never added before to the Live Map 310, the Navigation Manager sub-unit 33 determines the wandering path WP to repeatedly refocus the field of view 20, while S1 and S2 of the method are repeated until said entrance door 84 is found and stored in the Live Map 310.

In the embodiment of the invention where the entrance door 84 is not known by the visually impaired user, because the visually impaired user has just got off from a taxi to a completely new place where are two entrance doors 84-01 and 84-02 one close to another, the visually impaired user sends an information request to the Navigation Manager sub-unit 33 for finding "entrance door". Then the Navigation Manager sub-unit 33 queries the live Map 310 for the entrance doors in the area of interest from the proximity of the visually impaired user and finds that there are two entrance doors 84-01 and respectively 84-02.

If the two entrance doors 84-01 and 84-02 are not already stored in the Live Map 310, the Navigation Manager sub-unit 33 determines the wandering path WP until said entrance doors 84-01 and 84-02 are found and stored in the Live Map 310.

Once the two entrance doors 84-01 and 84-02 are found and stored in the Live Map 310 the Navigation Manager sub-unit 33 represents each of them as corresponding spatialized sounds and transmits same to the Feedback Unit 4 via the Feedback Manager sub-unit 35. Then the visually impaired user selects one among the entrance doors 84-01 and 84-02 as the entrance door 84 that constitutes his initial point of interest.

The Navigation Manager sub-unit 33 determines in S3 a single navigation path Pn, namely, an initial navigation path 911 for the visually impaired user to navigate from his standpoint to the entrance door 84. The preferred navigation path SP is thus the initial navigation path 911.

When the visually impaired user 1 navigates along the initial navigation path 911, the dog 83 is sensed by the Sensory unit 2.

The aggressivity of the dog is sensed as follows:
- if the dog barks, this is sensed by the Object Sound Characteristics Fusion module 308,
- if the dog has an aggressive expression on its face, this is sensed by the Object 2D Characteristics Extraction module 306,
- if the dog is moving or is trembling because it is furious, this is sensed by the Object 3D Characteristics Fusion module 307.

Since the data sensed by the basic sensors and, where applicable, by the additional sensors is fused and then sent to the Live Map sub-unit 31 such that to be included in the Live Map 310, the Navigation Manager sub-unit 33, when querying the Live Map 310, checks the at least two navigation path requirements and detects that the non-aggressivity requirement is not met. For this reason, the Navigation Manager sub-unit 33 it determines a secondary navigation path 912 towards the same initial point of interest PI 84. The preferred navigation path SP is now the secondary navigation path 912, which avoids the dog 83 having an adverse reaction.

Figure 16:
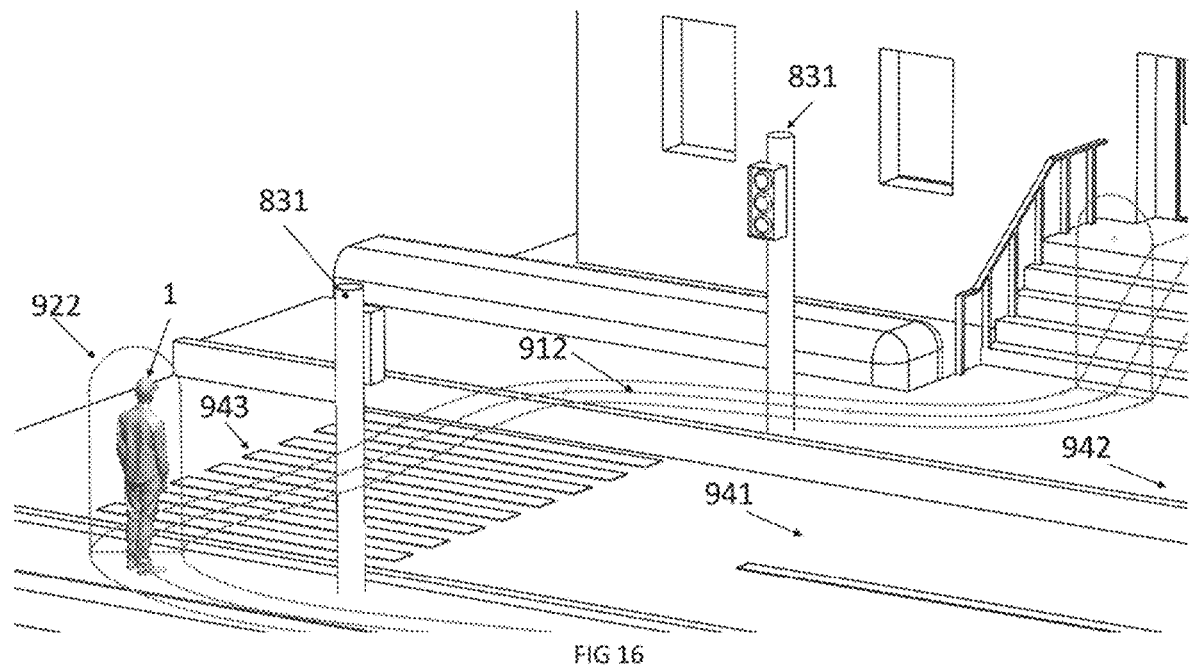

With reference to FIGS. 14, 15, and 16, the secondary path 912 must cross a road, which is an example of non-walkable area NA, using the two pedestrian crossings 832 which are examples of conditional walking area CWA 943.

When the visually impaired user 1 approaches the first pedestrian crossing 832, the Relationship Manager sub-unit 32 determine that the conditional area 943 is conditioned by the colour of the first traffic light 831.

Therefore, a conditional relation is built in the Live Map 310, by the Relationship Manager sub-unit 32, relating the colour of the first traffic light 831 to the conditional status of the first pedestrian crossing 832.

When the traffic light 831 turns green, the conditional walkable area 943 is considered walkable and the visually impaired user 1 receives the associated navigation guiding instruction to continue the navigation on the secondary path 912.

The same repeats on the second pedestrian crossing 832.

FIG. 16 depicts the visually impaired user 1 navigating on the secondary path 912 waiting at the second pedestrian crossing 832 for the colour of the second traffic light 831 to turn to green.

Figure 17:
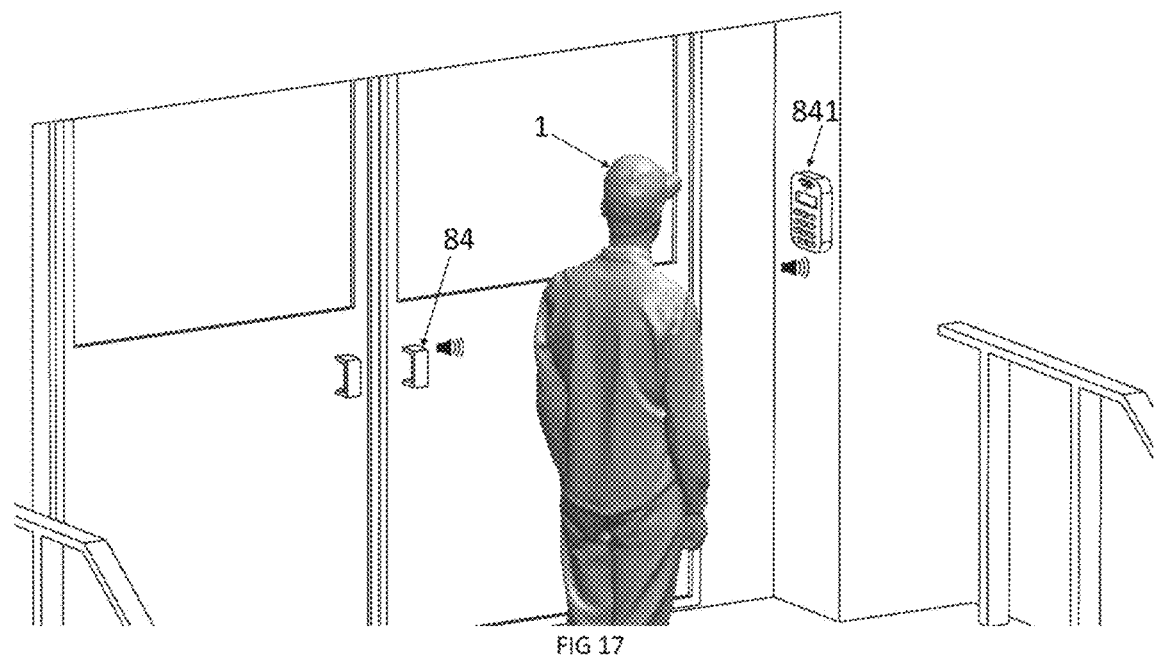

With reference to FIG. 17, the visually impaired user has already crossed both pedestrian crossings 832 and is approaching the initial point of interest namely the entrance door 84. The Relationship Manager sub-unit 32 determines a new parent-child relation between the initial point of interest, namely the door 84 and the further point of interest, namely the doorbell 841. Therefore, a new item 841 is created in the Live Map 310 corresponding to the doorbell 841 and the new parent-child relation between the the door 84 and the doorbell 841 is created by Relationship Manager sub-unit 32 and updated in the Live Map 310. The doorbell 841 replaced the door 84 as point of interest PI.

In FIG. 15 and in FIG. 16 it is depicted a walkable tunnel 922 that has a cross-section of around 1 m, that is around 0.5 m to the left and around 0.5 m to the right of the secondary navigation path 912, the latter being represented as a line.

If the preferred navigation path SP passes through an indoor space, such as an apartment, the cross-section is usually smaller, for example around 0.5 that is around 0.25 m to the left and around 0.25 m to the right of said preferred navigation path SP.

The details of the guiding of the visually impaired user through the walkable tunnel 922 are exemplified below in relation to FIG. 15 and FIG. 16. In this example, the wearable device 1 is provided with the left haptic feedback actuators 411, the right haptic feedback actuators 412 and the centre haptic feedback actuators 413, each of them comprising one or more linear resonant actuators.

In this example, the three-dimensional walkable tunnel T is selected for receiving the associated navigation guiding instructions.

The visually impaired user receives the start command by the first haptic cue—which is temporal, and the visually impaired user begins navigating.

The Feedback Manager sub-unit 35 will attempt to keep the visually impaired user on the preferred navigation path SP and within the limits of the walkable tunnel 922 by giving directional haptic cues.

If the visually impaired user, when navigating, is too close to the left side of the walkable tunnel 922, the second haptic cue—which is spatiotemporal, is received by the left feedback actuators 411. The linear resonant actuators of the left feedback actuators 411 output vibrations in rapid succession, one linear resonant actuator vibrating after another, in the direction in which the visually impaired user must reorient, that is to the right, giving the visually impaired user the tactile sensation of having the forehead dragged by someone to the right. The variation of the duration, periodicity, intensity or frequency of the vibration of the second haptic cue is proportional to the degree of closeness to the left side of the the walkable tunnel 922.

If the visually impaired user, when navigating, is too close to the right side of the walkable tunnel 922, the third haptic cue is received by the right feedback actuators 412—which is spatiotemporal, having identical configuration with the one of the second haptic cue except that it indicates as direction of reorientation the left instead of the right. The variation of the duration, periodicity, intensity or frequency of the vibration of the third haptic cue is proportional to the degree of closeness to the right side of the the walkable tunnel 922. Guiding the user forwards is by the fourth haptic cue, —which is spatiotemporal. The fourth haptic cue is received by the centre feedback actuators 413. The variation of the duration, periodicity, intensity or frequency of the vibration of the fourth haptic cue is proportional to the speed that the visually impaired user should have when navigating.

If the visually impaired user, when navigating, must reorient his direction of movement, on the horizontal plane, for example turn right when he arrives to the pedestrian crossroad 943 shown in FIG. 16, the fifth haptic pattern cue is received—which is spatiotemporal, by the centre feedback actuators 413. The variation of the duration, periodicity, intensity or frequency of the vibration of the fifth haptic cue is proportional to the degree of the turn.

If the visually impaired user, when navigating, must reorient his direction of movement on the vertical plane, for example when the visually impaired user has already crossed the pedestrian road 943 and is approaching the stairs of the building and has to climb some stairs, the sixth haptic cue is received—which is spatiotemporal, by the centre feedback actuators 413. The variation of the duration, periodicity, intensity or frequency of the vibration of the sixth haptic cue is proportional to the amount of movement required to the visually impaired user.

When the visually impaired user, arrives to the pedestrian crossroad 832 shown in FIG. 15 and FIG. 16, if the color of the traffic road 831 is red, the seventh haptic cue is received—which is temporal, corresponding to the associated navigation guiding instruction to temporary stop by the centre feedback actuators 413. Then, when the the traffic light 831 turns green, the seventh haptic cue is received again, this time corresponding to resuming the navigation.

The eighth haptic pattern cue—which is temporal, signals the end of the navigation as the point of interest PI is reached, being received from the centre feedback actuators 413.

Further types of haptic pattern cues can be defined to accommodate navigation situations or requirements of the user. For example, if the visually impaired user, when navigating, is centered within the walkable tunnel 922 of the secondary navigation path 912, the right feedback haptic actuators 412 and the left feedback haptic actuators 411 can either not present any type of haptic pattern cues, or present a ninth type of haptic pattern cue on both sides of the forehead, to signal the visually impaired user that he is navigating centered within the walkable tunnel 922.

Group of Examples No. 2

Taking the example from the description when the visually impaired user enters a new room that has four windows 85, the first 85-1, the second window 85-2, the third window 85-3, and the fourth window 85-4, and he wants to open one of the four windows 85, the potential point of interest PPI is the group of the four windows as at least one object On selected from the plurality of objects On.

The term "potential" signifies that any of the windows 85 of the room may be selected as initial point of interest PI.

With reference to FIGS. 18 to 28, the visually impaired user sends in sub-step S.3-0.1 the information request named "window" as potential point of interest PPI because that he is interested to find out more details regarding the windows from the room in order to choose the initial point of interest PI.

The person skilled in the art shall understand that the examples described apply to any kind of Objects On, and mutatis mutandis to the categories of living beings Ln.

In sub-step S.3.-0.2 the Sound representation sub-unit 36 represents each of the four windows 85, as corresponding spatialized sounds: the first spatialized sound S86-1, the second spatialized sound S86-2, the third spatialized sound S86-3, and the spatialized sound fourth S86-4 and transmits the four spatialized sounds to the Feedback Unit 4 via Feedback Manager sub-unit 35, when the Sound representation sub-unit 36 is not part of said Feedback Manager sub-unit 35.

In sub-step S.3-0.3 the visually impaired user selects as initial point of interest PI one from the four windows 85-1, 85-2, 85-3, 85-4, and transmits the corresponding selection request just like any other selection request.

Representation in sounds of the sub-step S.3-0.2 is exemplified below with reference to the FIGS. 18 to 28 for a single window, or for two windows from the group of four windows 85-1, 85-2, 85-3, 85-4. The person skilled in the art shall understand that the teaching of the invention is not limited to this group of examples and that the reference to the window 85 stands for any of the four windows 85-1, 85-2, 85-3, and 85-4. Likewise, the reference to the spatialized sound S86 stands for each of the corresponding spatialized sounds S86-1, S86-2, S86-3, and S86-4.

Figure 18:
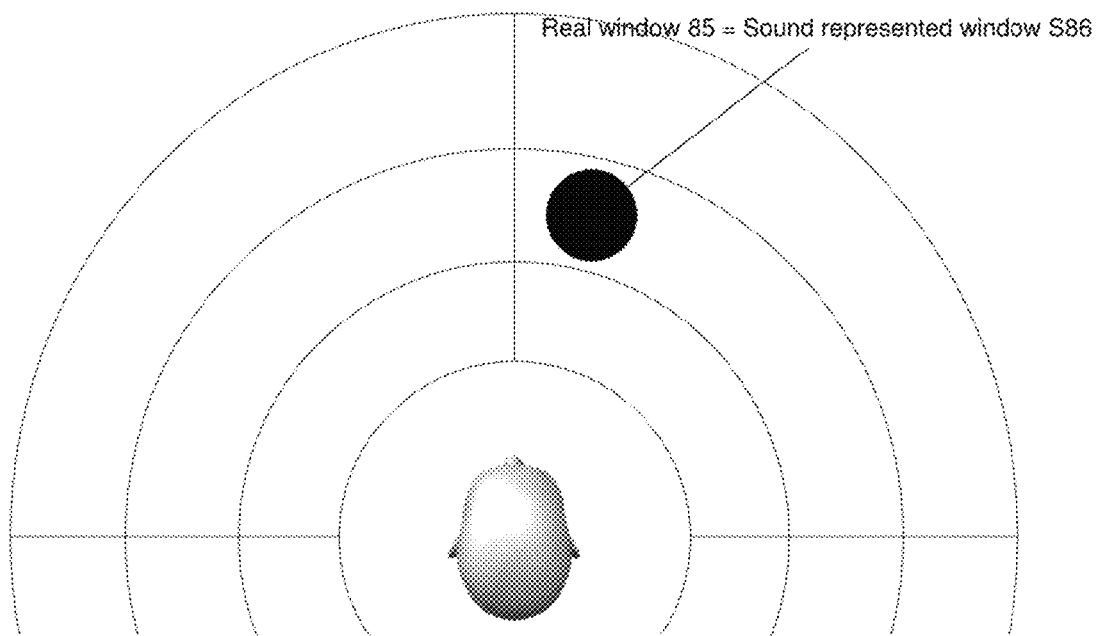

In example 2-1 with reference to FIG. 18, in a preferred embodiment, the Sound representation module 36 extracts from the Live map 310 the specific information regarding the window 85 which is the potential point of interest PPI, encodes them into the spatialized sound S86 perceived by the visually impaired user as emitted from the location of the window 85, and sends the spatialized sound S86 to the visually impaired user by means of auditory Feedback actuators 42.

In order to illustrate additional features of the window 85 representing said potential point of interest PPI, such as its dimensions, or density of the material, the Navigation Manager 33 will further encode the spatialized sound S86 into a spatialized sound having a particular frequency S86$f$, a particular time period S86$t$ and/or a particular pulse S86$p$, not represented graphically, said frequency S86$f$, particular time period S86$t$ and/or pulse S86$p$ corresponding to said additional features.

Figure 19A:
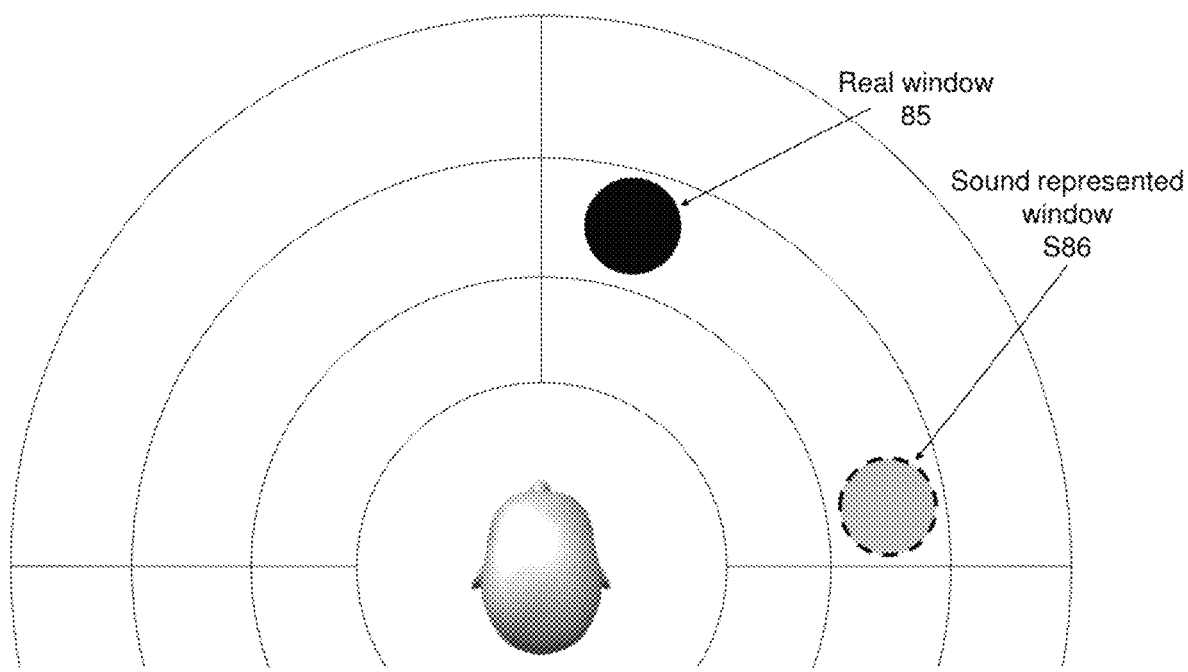
FIG. 19A Example No. 2-2—schematic representation of the step S.3-0.2 of the method wherein the spatialized sound S86 is an exaggerated or "zoomed" representation in respect to the window 85 on the elevation spatial dimension FIG. 19B Example No. 2-3—schematic representation of the step S.3-0.2 of the method wherein the spatialized sound S86 is an exaggerated or "zoomed" representation in respect to the window 85 as the potential point of interest PPI on the azimuth spatial dimension.
Figure 19B:
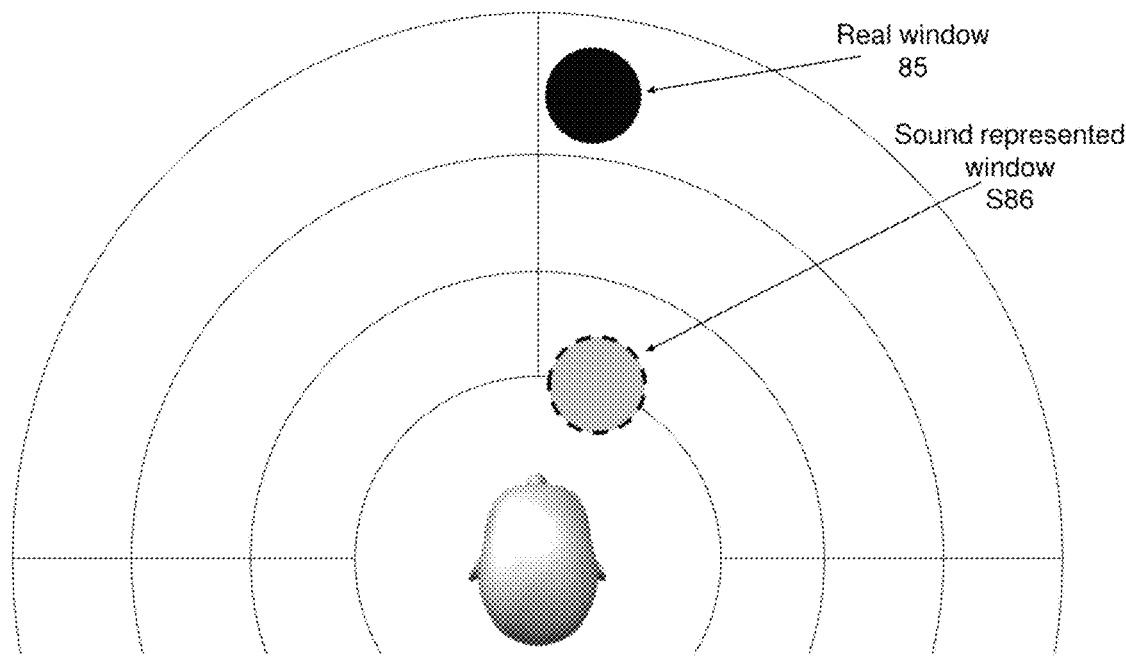

In examples 2-2 and 2-3 with reference to FIG. 19A and, respectively FIG. 19B, in another preferred embodiment, the Sound representation sub-unit 36 encodes the specific information regarding the selected window 85 into the spatialized sound S86, that has an exaggerated or "zoomed" representation in respect to the location of the potential point of interest 85. If, for example, the potential point of interest 85 is at a range of 10 meters, it will be represented in the spatialized sound S86l at a range of, for example, 1 meter. This zoom or exaggeration effect is presented to the visually impaired user on both the elevation as shown in FIG. 19A, and on the azimuth, as shown in FIG. 19B.

Figure 20:
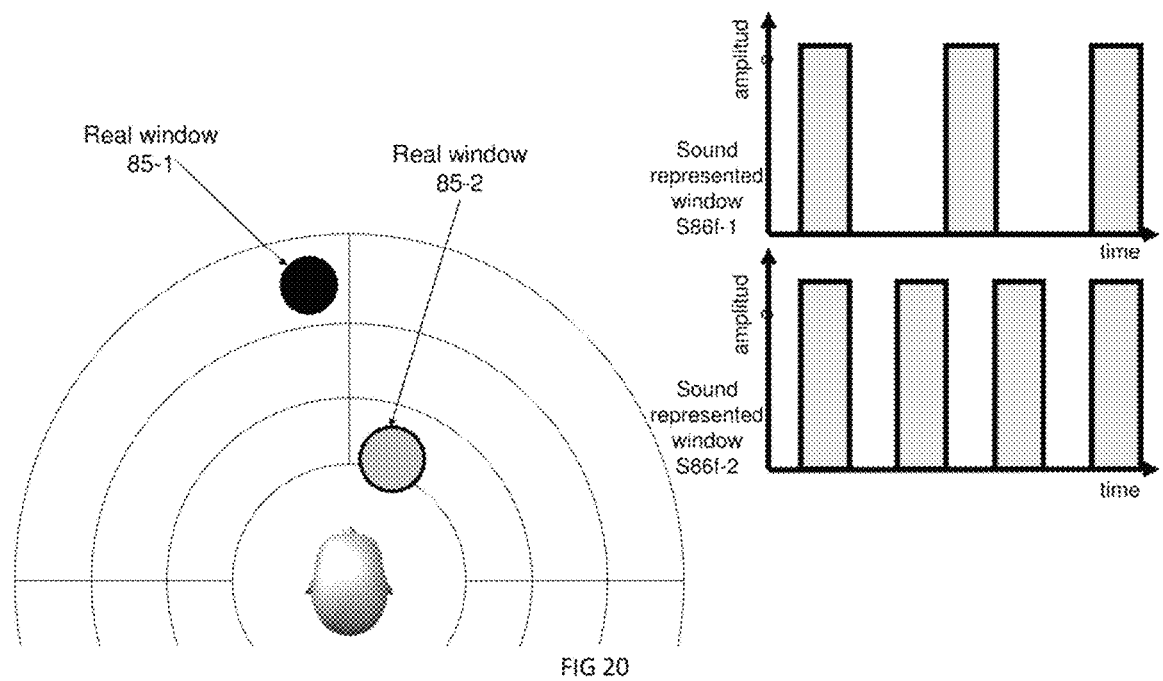
FIG. 20 Example No. 2-4—schematic representation of the step S.3-0.2 of the method wherein the two windows 85-1 and 85-2, placed at non-equal distances from the visually impaired user, are sound-represented with different frequency characteristic of the virtualized sounds S86/-1, and, respectively, S86/-2 depending on the distances of the windows 85-1, and 85-2 from the visually impaired user.

In example 2-4, with reference to FIG. 20, in another preferred embodiment, the visually impaired user sends the request for Sound representation of two windows 85-1, and 85-2 that are placed at non-equal distances from the visually impaired user.

The Sound representation sub-unit 36 encodes the specific information of the selected windows 85-1, and 85-2 from the Live map 310 into the spatialized sounds S86$f$-1, and S86$f$-2 having different frequency features depending on the distance of the windows 85-1, and 85-2 to the visually impaired user, and sends the encoded spatialized sounds S86$f$-1, and S86$f$-2 to the visually impaired user.

Thus, for example, the corresponding audio cues of the spatialized sounds S86$f$-1, and S86$f$-2 corresponding to the additional features of the window 85 sent to the visually impaired user vary in frequencies: the cues last longer and/or the degree of repetition is higher for the window 85-2 than the one that is nearer to the visually impaired user, 85-1 respectively.

Figure 21:
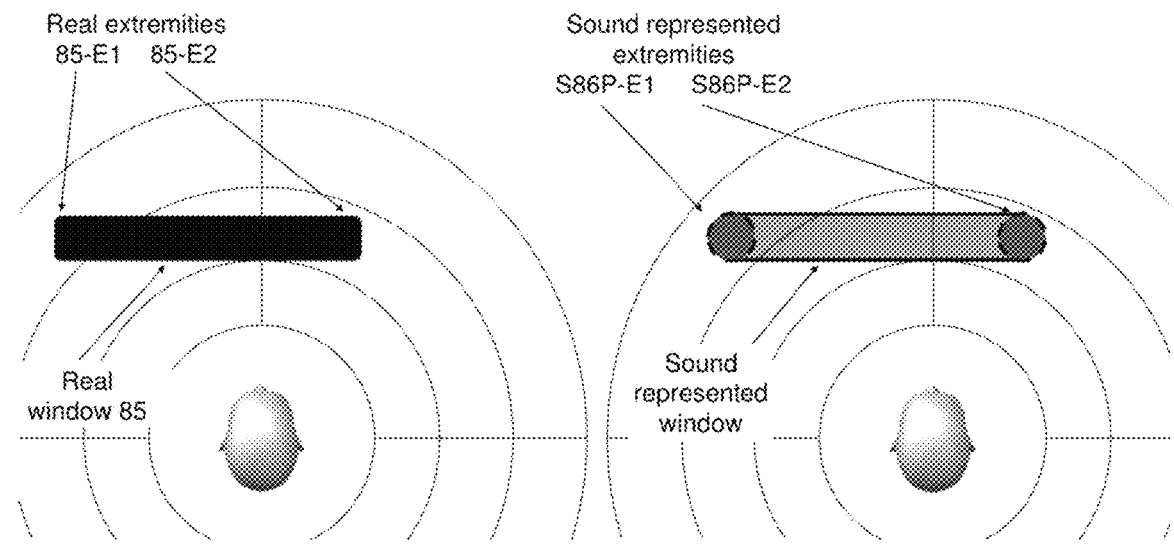
FIG. 21 Example No. 2-5—schematic representation of the step S.3-0.2 of the method wherein the margins of the window 85 are sound—represented by two spatialized sounds S86P-E1, and S86P-E2 having different encoding characteristics depending on the distance of each the extremities relative to the visually impaired user.

In example 2-5, with reference to FIG. 21, in another preferred embodiment, the visually impaired user sends the request to represent in sounds the margins of the window 85. For simplicity, it was chosen to represent only two of the extremities, respectively 85-E1 and 85-E2, the person skilled in the art understands that the same representation applies for all extremities of the window, depending on its shape.

The Sound representation sub-unit 36 extracts the specific information of the selected window 85 from the Live map 310, encodes it into spatialized sounds S86P-E1, and S86P-E2 corresponding to the window extremities 85-1E and 85-E2, the spatialized sounds S86P-E1, and S86P-E2 having different encoding characteristics depending on the distance of each of the two chosen extremities relative to the visually impaired user. The distance can be measured either on the azimuth, on the elevation or on the range of the window 85, or in any combination of the aforementioned.

Figure 22:
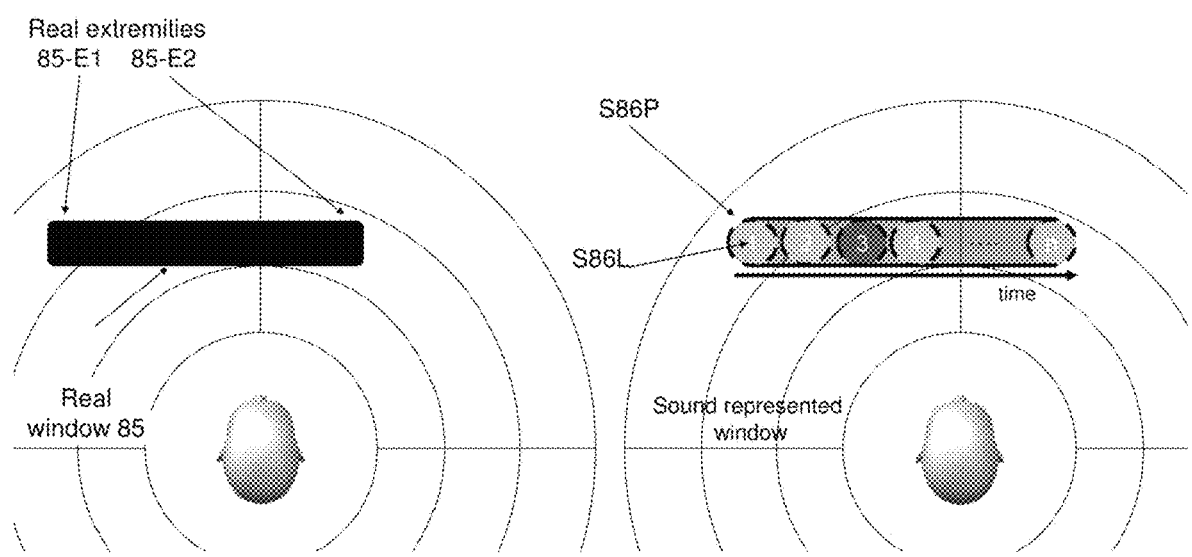
FIG. 22 Example No. 2-6—schematic representation of the step S.3-0.2 of the method showing the representation of the dimensions S86P, and S86L of the window 85

In example 2-6, with reference to FIG. 22, in another preferred embodiment, the visually impaired user sends the request by the User commands interface 5 to the Sound representation sub-unit 36 via the User Commands Interface sub-unit 34 for representation of the dimensions of the window 85 as a potential point of interest PPI.

The Sound representation sub-unit 36 encodes the specific information of the dimensions of the selected window 85 extracted from the Live Map 310 into temporal spatialized sound S86P representing punctiform sounds along one of the three spatial dimensions between chosen extremities of the window 85 or a linear sound S86L moving on a straight-line path from the extremity 85-E1 to the extremity 85-E2, and sends them to the visually impaired user by means of auditory Feedback actuators 42. The same operation is carried out for the others extremities of the window 85, specifically 85-E3, and 85-E4 in case the window 85 is rectangular (not represented graphically).

The dimensions of the window 85 are measured between the extremities 85-E1, and 85-E2, 85-E3, and 85-E4 of the window 85 along the corresponding spatial dimensions by means known from the prior art.

In examples from 2-7 to 2-10 with reference to FIGS. 23-26, in another preferred embodiments, the visually impaired user sends the request for representation of the shape of the window 85 or a window part. In the examples from 2-7 to 2-10, the window 85 can be a decorative window that is not rectangular, or a mirror or a decorative part of a door. For simplicity it will be referenced as window 85.

The Sound representation sub-unit 36 extracts the specific information from the Live map 310, encodes it into temporal spatialized sounds S86 representing the shape of the window 85.

Figure 23:
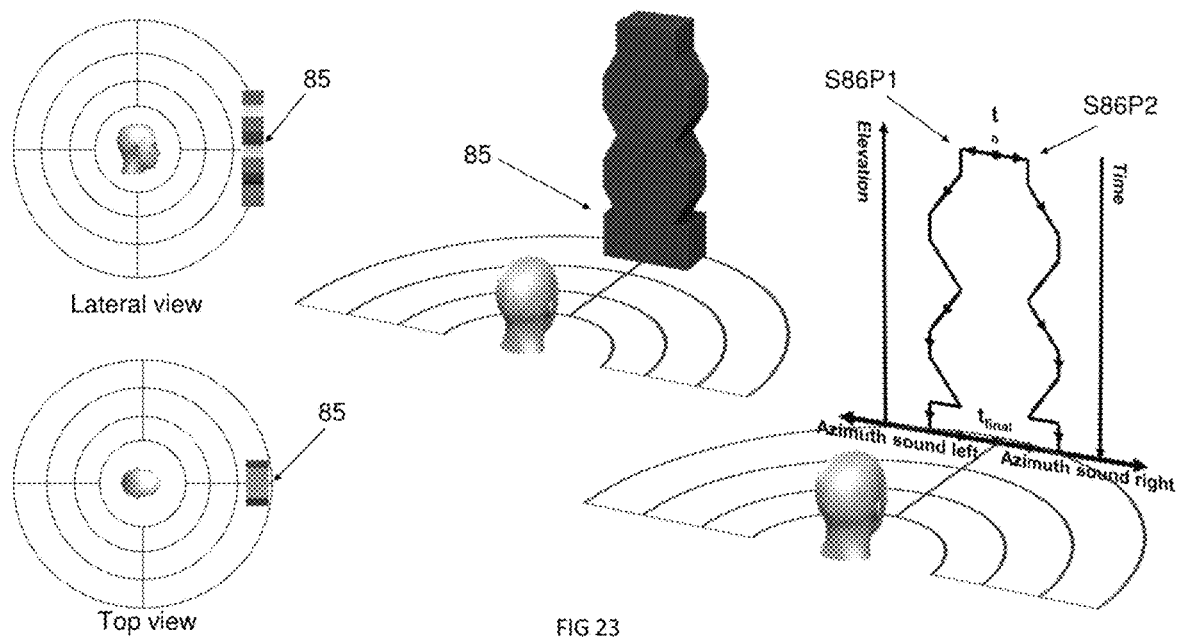
FIG. 23 Example No. 2-7—schematic representation of the step S.3-0.2 of the method wherein the shape of the window 85 is represented by two spatialized punctiform sound sources S86P1 and S86P2

In example 2-7, with reference to FIG. 23, the shape of a window 85 is represented by two spatialized punctiform sounds S86P1, and S86P2, each of them virtually moving in the same time on the half of the contour of the window 85 from a starting point $t_0$ placed on the vertical symmetrical axe of the window 85 to an end point $t_{final}$.

Figure 24:
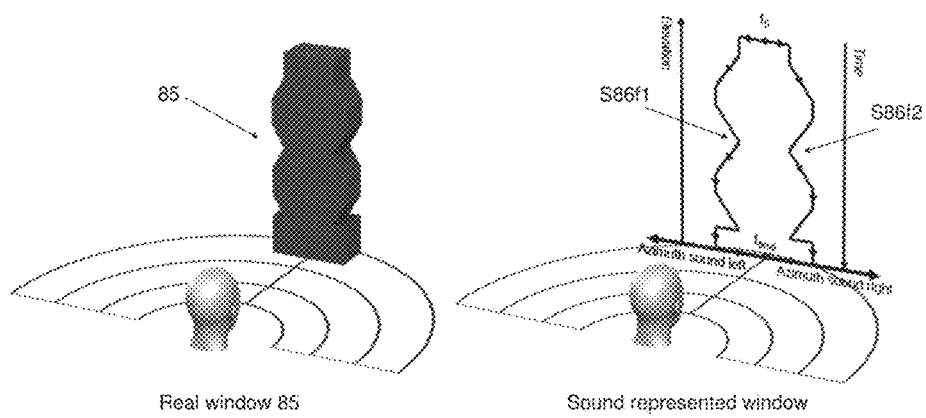
FIG. 24 Example No. 2-8—schematic representation of the step S.3-0.2 of the method wherein the shape of the window 85 is represented by two spatialized sound sources S86/1, and S86/2 having different frequency on the azimuth.

In example 2-8, with reference to FIG. 24, the shape of the window 85 is represented by two spatialized sounds S86/1, and S86/2, that virtually moves on the contour of the window from the starting point $t_o$ the end point $t_{final}$, while the spatialized sounds S86/1, and S86/2 being encoded with different frequency, depending on the distance relative to the user of the contour of the window part 85 travelled by the spatialized sound.

Figure 25:
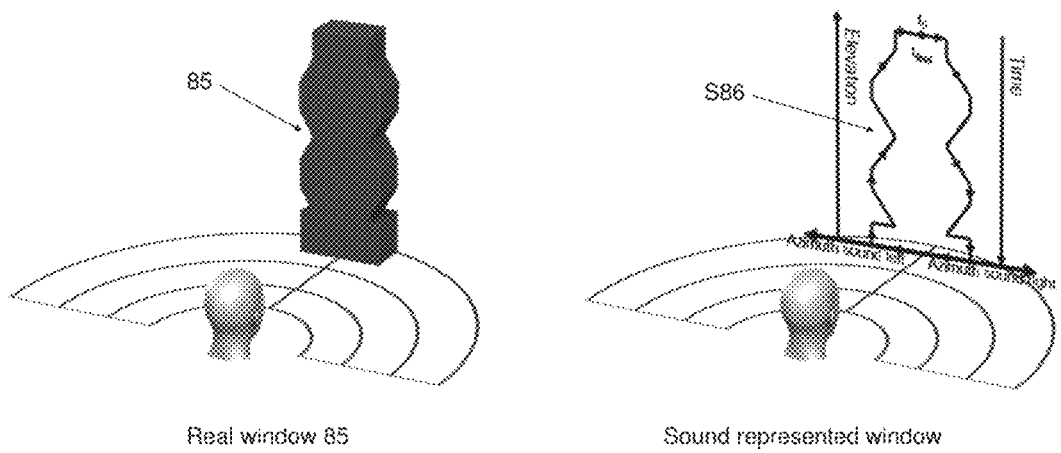

In example 2-9, with reference to FIG. 25, the shape of the window 85 is represented by a single spatialized sound S86 that virtually moves from the starting point $t_0$ on the contour of the window part 85 until it reaches back to the starting point starting point $t_0$.

Figure 26:
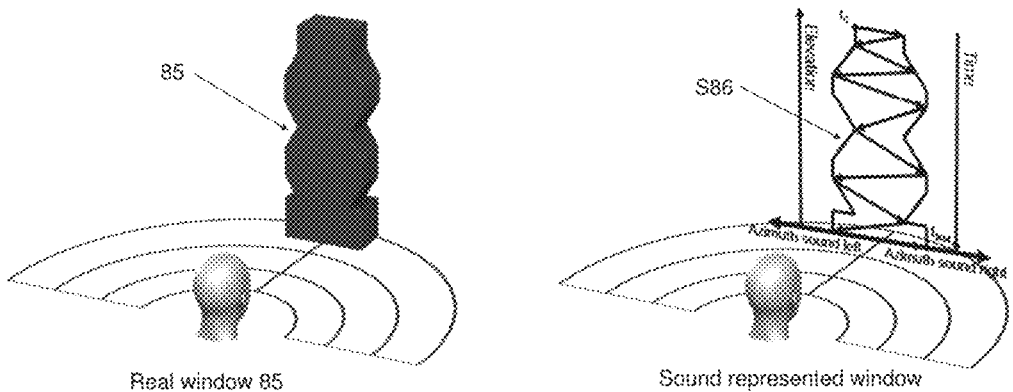
FIG. 26 Example No. 2-10—schematic representation of the step S.3-0.2 of the method wherein the shape of the window 25 is represented by the single spatialized sound source S86 that virtually travels in an angled pattern.

In example 2-10, with reference to FIG. 26, the shape of the window 85 is represented by the single spatialized sound S86 that virtually moves in an angled pattern within the space between the interior contour, and exterior contour of the window 85.

Figure 27:
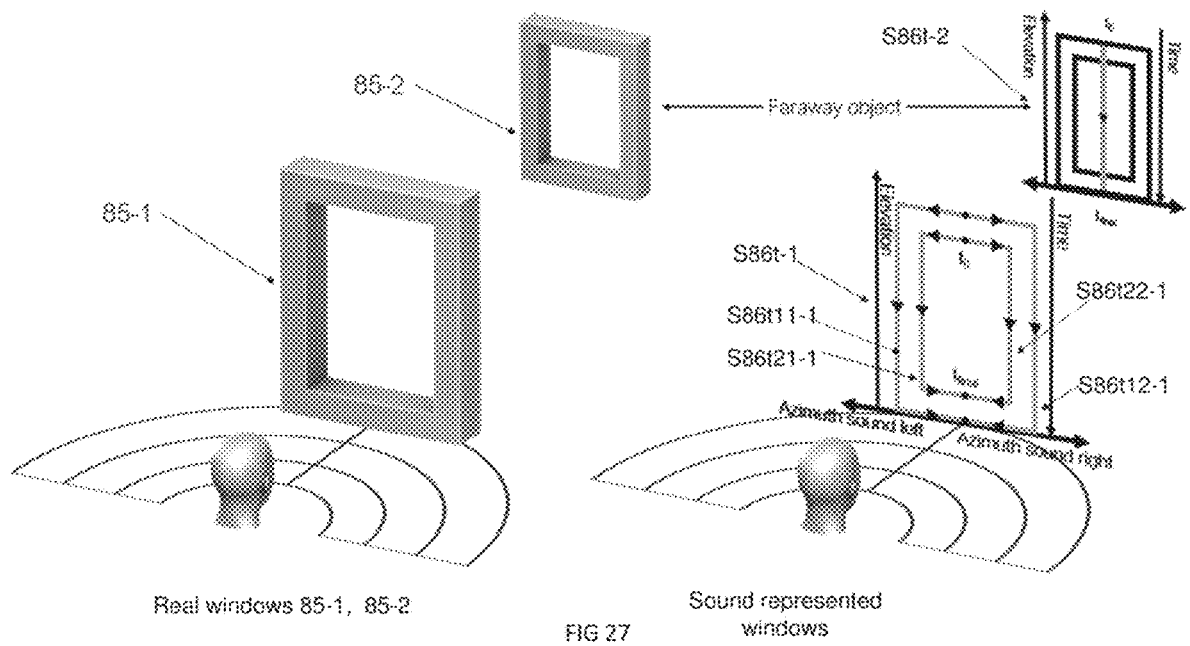
FIG. 27 Example No. 2-11—schematic representation of the step S.3-0.2 of the method showing the representation of two windows 85-1, and 85-2, placed at different distances relative to the visually impaired user.
Figure 28:
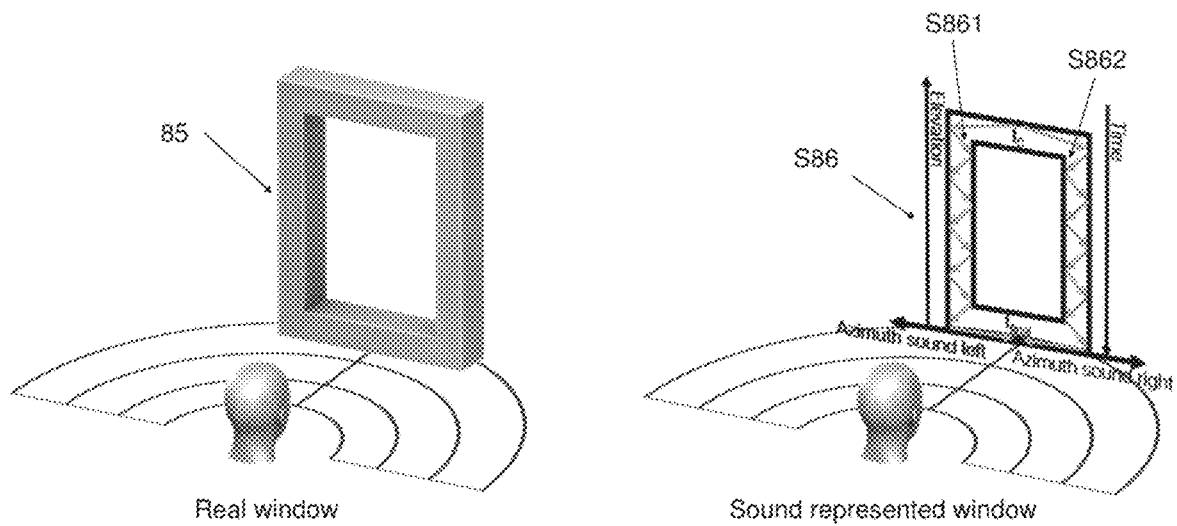
FIG. 28 Example No. 2-12—schematic representation of the step S.3-0.2 of the method showing the sound representation of a window 85 by two spatialized sounds S861, S862 that start at the same time, and travel in angled patterns inside the interior frame of the window 85.

In examples 2.11, and 2.12 with reference to FIGS. 27, and 28, in another preferred embodiments, the selected window can stand for a window or for a door. In these two examples the window has at least one interior frame, either for decorative purpose or with a technical function. The contour of the interior frame is important in these preferred embodiments, for example because of the risk of injury or because the handle of the door or window is on the interior frame.

In example 2.11 with reference to FIG. 27, there are two windows 85-1, and 85-2 standing together as potential point of interest, placed at different distances relative to the visually impaired user. They can be windows or doors. The stand together as potential point of interest because the action needed to be taken by the visually impaired user concerns both. For example, there are two separated windows that must be both open or there is a hallway with two doors through which the visually impaired user must pass.

The two windows 85-1 and 85-2 are separated by open space of various dimensions (e.g.: 5-10 cm in case of windows or 1-2 meters in case of the doors). The visually impaired user is placed closer to the window 851.

The visually impaired user sends the request for the Sound representation of the open space distance between the two windows 85-1 and 85-2 as well as for the shape of the interior frame of the two windows 85-1 and 85-2.

The Sound representation sub-unit 36 extracts the specific information from the Live map 310 of the two windows 85-1 and 85-2, encodes it into spatialized sounds S86t-1, and S86t-2 having different time characteristics for representing the shape of the interior frames of the two windows 85-1 and 85-2.

The window 85-1 placed closer to the visually impaired user, as it is shown in the FIG. 27, is represented by two spatialized sounds S86t1-1, and S86t2-1, one spatialized sound S86t1-1 representing the outside contour of the window 85-1, and the other spatialized sound S86t2-1 representing internal contour of the window 85-1. Each of the spatialized sounds S86t1-1, and S86t2-1 comprise two other spatialized sounds, that start at the same time, S86t11-1 with S86t12-1 representing the outside contour of the window 85-1, and S86t21-1 with S86t21-1 representing internal contour of the window 85-1.

Because of the open space between the two windows 85-1 and 85-2, the window 85-1 placed closer to the visually impaired user acts like a barrier for detecting detailed information regarding the second window 85-2, consequently the The Sound representation sub-unit 36 is able only to output a simplified spatialized sound S86t-2 corresponding to the three-dimensional position of the window 85-2 and its vertical dimension.

In example 2-12, with reference to FIG. 28, in another preferred embodiment, the visually impaired user sends the request for the sound representation of the details of the shape of the interior frame of the window 85.

For simplicity, FIG. 28 illustrates a rectangular shape, but it can be any geometrical shape.

The Sound representation sub-unit 36 extracts the specific information from the Live map 310, encodes it into two spatialized sounds S861, and S862 starting at the same time, virtually moving in an angled pattern within the space between the contour of the interior frame, and the exterior contour of the window 85.

While the description of the method and the system was disclosed in detail in connection to preferred embodiments, those skilled in the art will appreciate that modifications may be made to adapt a particular situation without departing from the essential scope to the teaching of the invention.

Reference numerals appearing in the claims are by way of illustration only and shall have no limiting effect on the scope of the claims.

The invention claimed is:

1. A wearable device for assisting the movement of a visually impaired user, comprising:
   multiple sensors that each generate respective sensor data;
   a sensory fusion processor that is configured to fuse the generated sensor data into fused data;
   a live map manager that is configured to create and update a live map based at least on the fused data;
   a walkable area detection module that is configured to designate, in the live map, a free area that includes (i) an unconditional walkable area that is walkable when a first set of walkable area criteria are satisfied, and (ii) a conditional walkable area that is walkable when both the first set of walkable area criteria and a second set of walkable area criteria are satisfied;
   a navigation manager that is configured to select, from among multiple candidate paths, a particular path for the visually impaired user;
   multiple haptic or auditory actuators and that are configured to output a representation of the selected, particular path to the visually impaired user.

2. The device of claim 1, wherein the first set of walkable area criteria, the second set of walkable area criteria, or the safety criteria include respective parameters that are customized for the user.

3. The device of claim 1, wherein the first set of walkable area criteria, the second set of walkable area criteria, or the safety criteria are specified as geometric predetermined walkable area requirements.

4. The device of claim 1, wherein the first set of walkable area criteria, the second set of walkable area criteria, or the safety criteria relate to ground surface characteristics.

5. The device of claim 1, wherein the second set of walkable area criteria-specify conditions that, when satisfied, render a portion of the free area as the second type of walkable area.

6. The device of claim 1, wherein the second set of walkable area criteria specify traffic light cycle conditions that, when satisfied, render of a portion of the free area as the second type of walkable area.

7. The device of claim 1, wherein the navigation manager selects the particular path automatically or at the request of the user.

8. A wearable device for assisting the movement of a visually impaired user, the wearable device comprising:
- a navigation manager that is configured to select a particular path for the visually impaired user, the particular path being associated with multiple guiding instructions;
- multiple haptic or auditory actuators and that is configured to output a respective audio or haptic cue associated with each of the multiple guiding instructions using a respective, determined output characteristic for each cue,
- wherein the navigation manager is configured to determine a direction on the particular path based on the line having (i) one point at a location of the wearable device and (ii) another point at an intersection of (a) the particular path and (b) a circle having a center at the location of the wearable device, and having a radius r with a predetermined length, and
- wherein the respective audio or haptic clues have output characteristics that are based on the direction.

9. The wearable device of claim 8, comprising:
- a user commands interface manager that is configured to receive a selection of one or more objects from the live map; and
- a sound representation unit that is configured to generate spatialized sounds for the one or more objects that the user selects from the live map using the user commands interface manager.

10. The wearable device of claim 8, wherein the particular path is associated with a particular path complexity criteria, and wherein the output characteristic for one or more of the multiple guiding instructions includes a variable intensity, duration, repetition, frequency, or 3D spatial virtualization output characteristic that is selected based on the particular path complexity criteria.

11. The wearable device of claim 8,
- wherein the navigation manager is configured to output a representation of the selected, particular path,
- wherein the representation includes a horizontal longitudinal axis of a three-dimensional walkable, virtual tunnel having virtual walls that are located based on a predetermined virtual tunnel cross-section, and
- wherein one or more of the multiple haptic or auditory actuators are configured to output a respective audio or haptic cue when the visually impaired user approaching the virtual walls of the walkable, virtual tunnel.

12. The wearable device of claim 8,
- wherein the navigation manager is configured to output the representation of the selected, particular path,
- wherein the representation of is segmented into predetermined segments that are delimited by a plurality of milestones, and
- wherein one or more of the multiple haptic or auditory actuators are configured to output a respective audio or haptic cue indicating a position of one or more next milestones.

13. The wearable device of claim 12,
- wherein a length of each predetermined segment varies depending on a complexity value and length associated with the particular path.

14. The wearable device of claim 8, wherein the respective audio or haptic clue signals a direction associated with a particular guiding instruction.

15. The wearable device of claim 8,
- wherein the auditory cues are spatialized sounds originating from a spatialized sound source that virtually travels along a predetermined second distance on the particular path from a position of the wearable device until the spatialized sound source reaches the end of the predetermined second distance and back to the position of the wearable device.

* * * * *